US010523778B1

(12) United States Patent
Lee et al.

(10) Patent No.: US 10,523,778 B1
(45) Date of Patent: Dec. 31, 2019

(54) UTILIZING VIRTUALIZATION CONTAINERS TO ACCESS A REMOTE SECONDARY STORAGE SYSTEM

(71) Applicant: Cohesity, Inc., San Jose, CA (US)

(72) Inventors: Woojae Lee, Milpitas, CA (US); Akshit Poddar, Santa Clara, CA (US); Suresh Bysani Venkata Naga, San Jose, CA (US); Sudhir Srinivas, Cary, NC (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/226,335

(22) Filed: Dec. 19, 2018

Related U.S. Application Data

(60) Provisional application No. 62/730,458, filed on Sep. 12, 2018.

(51) Int. Cl.
| | | |
|---|---|---|
| *G06F 15/16* | (2006.01) |
| *H04L 29/08* | (2006.01) |
| *G06F 3/06* | (2006.01) |
| *G06F 12/0868* | (2016.01) |
| *G06F 9/451* | (2018.01) |
| *G06F 9/455* | (2018.01) |
| *G06F 11/14* | (2006.01) |

(52) U.S. Cl.
CPC ........ *H04L 67/2842* (2013.01); *G06F 3/0605* (2013.01); *G06F 3/067* (2013.01); *G06F 3/0622* (2013.01); *G06F 3/0664* (2013.01); *G06F 9/451* (2018.02); *G06F 9/45558* (2013.01); *G06F 11/1464* (2013.01); *G06F 12/0868* (2013.01); *H04L 67/10* (2013.01); *H04L 67/16* (2013.01); *G06F 2009/45595* (2013.01); *G06F 2201/84* (2013.01); *G06F 2212/152* (2013.01)

(58) Field of Classification Search
CPC ......... H04L 67/16; H04L 67/34; H04L 67/40; H04L 67/1004; H04L 67/1008; H04L 67/1097; H04L 67/1095; H04L 67/2842; H04L 63/0428; H04L 63/0815; H04L 63/0884; H04L 63/101
USPC ........ 709/217–218, 223, 225, 229–230, 232, 709/236
See application file for complete search history.

(56) References Cited

U.S. PATENT DOCUMENTS

| | | |
|---|---|---|
| 2009/0037224 A1 | 2/2009 | Raduchel |
| 2010/0031349 A1 | 2/2010 | Bingham |
| 2010/0169591 A1* | 7/2010 | Atluri ................ G06F 11/1469 711/162 |
| 2010/0332479 A1 | 12/2010 | Prahlad |
| 2013/0111572 A1 | 5/2013 | Gaddam |
| 2015/0149530 A1 | 5/2015 | Maret |
| 2015/0227749 A1 | 8/2015 | Schincariol |
| 2016/0337426 A1 | 11/2016 | Shribman |
| 2018/0075231 A1 | 3/2018 | Subramanian |

(Continued)

*Primary Examiner* — Farzana B Huq
(74) *Attorney, Agent, or Firm* — Van Pelt, Yi & James LLP

(57) ABSTRACT

An identifier associated with a persistent connection virtualization container corresponding to a specified secondary storage system identifier associated with a secondary storage system is requested from a caching service virtualization container. The identifier associated with the persistent connection virtualization container corresponding to the specified secondary storage system identifier is received. One or more commands are provided to the persistent connection virtualization container associated with the secondary storage system.

25 Claims, 15 Drawing Sheets

(56) References Cited

U.S. PATENT DOCUMENTS

2018/0150234 A1* 5/2018 Karmarkar ............ G06F 3/0629
2018/0165299 A1* 6/2018 Danilov .............. G06F 16/1794
2018/0285210 A1* 10/2018 Mitkar ................ G06F 11/1469
2019/0036678 A1   1/2019 Ahmed
2019/0075130 A1   3/2019 Petry

* cited by examiner

UTILIZING VIRTUALIZATION CONTAINERS TO ACCESS A REMOTE SECONDARY STORAGE SYSTEM

CROSS REFERENCE TO OTHER APPLICATIONS

This application claims priority to U.S. Provisional Patent Application No. 62/730,458 entitled MANAGEMENT OF SECONDARY STORAGES AND APPLICATIONS filed on Sep. 12, 2018, which is incorporated herein by reference for all purposes.

BACKGROUND OF THE INVENTION

A datacenter may be comprised of a primary system and a secondary storage system. A user associated with the datacenter may remotely access and manage the secondary storage system via a cloud. Bidirectional communications may be established between the secondary storage system and a container associated with a first access service running on one or more servers that are hosted in the cloud. The container may handle communications with the secondary storage system. However, containers are ephemeral in nature. A container may be associated with the first access service at a first point in time and a second access service running on one or more servers that are hosted in the cloud at a second point in time. This may cause the bidirectional communications between the secondary storage system and the container to be disrupted. As a result, the user associated with the datacenter may not be able to access and manage the secondary storage system via the cloud.

BRIEF DESCRIPTION OF THE DRAWINGS

Various embodiments of the invention are disclosed in the following detailed description and the accompanying drawings.

DETAILED DESCRIPTION

Figure 1:
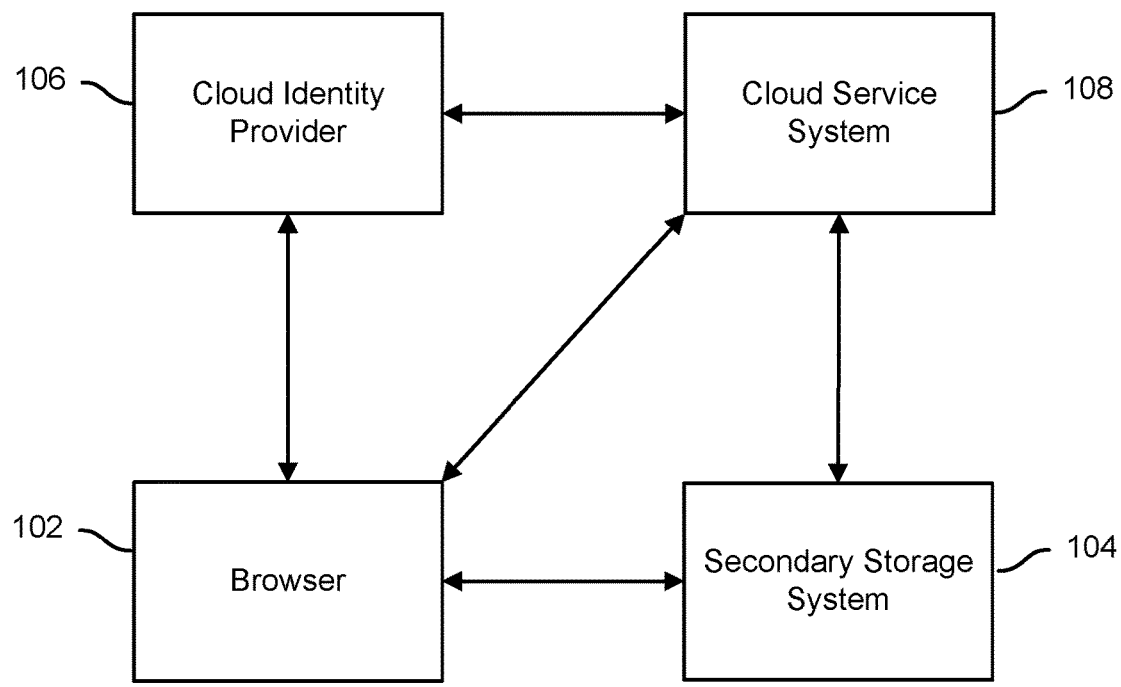
FIG. 1 is a diagram illustrating an embodiment of a system for cluster claim.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A datacenter may be comprised of a primary system and a secondary storage system. The secondary storage system may be comprised of a plurality of storage nodes (e.g., a computer cluster) located at the datacenter (sometimes referred to as "on premises" or "on-prem."). The secondary storage system may cause a primary system to perform a backup snapshot according to a backup policy and to store the backup snapshot to the secondary storage system. The backup snapshot may be stored across the plurality of storage nodes. A backup snapshot represents the state of the primary system at a particular point in time (e.g., the state of the file system data). The backup policy may require a full backup snapshot or an incremental backup snapshot to be performed. A full backup snapshot stores the entire state of the primary system at a particular point in time. The file system data of the primary system is comprised of a plurality of data blocks. The primary system may include a change block tracker that monitors and identifies one or more data blocks of the primary system that have changed (e.g., modified, deleted, added) since the last backup snapshot. An incremental backup snapshot includes the one or more data blocks that have changed since the last backup snapshot. The secondary storage system may send to the primary storage system a backup snapshot command that causes the primary system to perform a backup snapshot. Responsive to receiving the backup snapshot command from the secondary storage system, the primary system may perform a backup snapshot.

A user associated with the secondary storage system may access and manage the primary system and/or the secondary storage system at the physical location of the datacenter. The user associated with the secondary storage system may also remotely access and manage the primary system and/or the secondary storage system. For example, the user may remotely access and manage the primary and/or secondary storage system via a virtual private network (VPN) connection. However, a user associated with the secondary storage system may be associated with a plurality of secondary storage system located at different locations. For example, an enterprise may have a first secondary storage system located at a first location (e.g., New York) and a second secondary storage system located at a second location (e.g., Singapore). The user is physically incapable of being at both locations at the same time. The user may remotely access and manage the first secondary storage system and the second secondary storage system at the same time from a single location, however, such remote access and management usually requires separate browser sessions. The user may accidentally confuse the two browser sessions. For example, the user may interact with the first browser session while trying to access the data associated with the second secondary storage system or interact with the second browser session while trying to access the data associated with the first secondary storage system.

The user may be able to access and manage one or more secondary storage systems via a cloud service system. The cloud service system may be configured to provide a unified management interface for the one or more secondary storage systems to which the user is associated. This enables to the user to remotely access and manage the one or more secondary storage systems that are physically located separately throughout the world from a single location and also reduces user error because the user is able to access the data from a single browser session.

The user may perform a cluster claim procedure to enable the user to access and manage a plurality of secondary storage systems via the cloud service system. The cluster claim procedure is a procedure by which a secondary storage system is registered with a cloud service system such that the secondary storage system and cloud service system are aware of each other. A user associated with the secondary storage system may perform the cluster claim procedure for each of the secondary storage systems to which the user is associated.

Bidirectional communications may be established between the secondary storage system and the cloud service system so that any time, either the secondary storage system can request data from the cloud service system or the cloud service system can request data from the secondary storage system. A user associated with a plurality of secondary storage systems may desire to access and manage one or more of the secondary storage systems at any particular point in time. The cloud service system may provide to the user associated with the secondary storage system a user interface with up-to-date information associated with the secondary storage systems. For example, the up-to-date information may comprise information, such as available protection jobs to restore, deduplication information, an indication of whether any of the storage nodes of the secondary storage system are offline, statistics associated with the secondary storage system, etc.

The secondary storage system may provide the cloud service system information on a periodic basis (e.g., every five minutes) so that the cloud service system can provide the up-to-date information. For example, the secondary storage system may provide the cloud service system metadata associated with the available protection jobs so that the cloud service system is able to provide the user with a list of available protection jobs via the user interface associated with the cloud service system. This may require a persistent connection pipe from the secondary storage system to the cloud service system so that a connection procedure does not need to be perform each time the secondary storage system provides information to the cloud service system.

A user associated with the secondary storage system may at any time request via the user interface associated with the cloud service system, for the secondary storage system of the datacenter to perform a backup snapshot of the file system data associated with the primary system of the datacenter. The cloud service system may provide a command to the secondary storage system that causes the primary system to perform a backup snapshot. This may require a persistent connection pipe from the cloud service system to the secondary storage system so that a connection procedure does not need to be perform each time the cloud service system sends a command to the secondary storage system.

The secondary storage system of the datacenter is located behind a firewall. The secondary storage system may initiate communications with the cloud service system, but the firewall is configured to prevent the cloud service system from initiating communications with the secondary storage system. For example, the secondary storage system may send a request to the cloud service system and the cloud service system can send a reply in response to the request, but the cloud service system cannot send a request to the secondary storage system and the secondary storage system won't send a reply to the request. To manage one or more secondary storage systems via the cloud service system, the cloud service system needs to initiate communications with the secondary storage systems.

The secondary storage system of a datacenter or the cloud service system may initiate communications after bidirectional communications are established between the secondary storage system of the datacenter and the cloud service system. A user associated with an enterprise may establish corresponding bidirectional communications for a plurality of secondary storage systems associated with the enterprise. A plurality of enterprises may utilize the cloud service system and establish bidirectional communications for each of the secondary storage systems. The cloud service system may include a corresponding persistent connection virtualization container for each of the secondary storage systems to handle bidirectional communications. The plurality of persistent connection virtualization containers may be part of one or more access services that are running on one or more servers hosted in a cloud environment. A service may be a grouping of containers that are running on one more servers hosted in the cloud.

A user associated with a secondary storage system may access and manage the secondary storage system via a user interface (UI) service virtualization container. The UI service virtualization container may provide a UI that includes information associated with the secondary storage system. For example, the information associated with the secondary storage system may include the amount of available storage, a list of one or more protection jobs available to be restored, etc. The UI service virtualization container may receive from the user via the UI one or more commands. The UI service virtualization container may forward the one or more commands to a persistent connection virtualization container associated with the secondary storage system. However, containers are ephemeral in nature. A container may be associated with a first access service at a first period of time, go offline for a period of time for one or more various reasons, and be reborn in the first access service or be associated with a different access service after the period of time. A container has an associated IP address. The associated IP address may be reassigned to a different container when the container goes offline. The container may assigned a new IP address when the container is reborn. Due to the ephemeral nature of containers, a UI service virtualization container may not be able to forward to a persistent connection virtualization container the one or more commands received from the user because the UI service virtualization container is not sure which persistent connection virtualization container is associated with a secondary storage system that the user desires to access and manage. This may cause a disruption in service because a user associated with the secondary storage system is unable to access and manage the secondary storage system via the cloud service system.

A caching service virtualization container may record and preserve a state associated with bidirectional communications. For example, the state may include an IP address associated with a persistent connection virtualization container, a data center to which the persistent connection virtualization container is associated, a secondary storage system identifier associated with a secondary storage system, a clusterID, etc. Each time a persistent connection virtualization container establishes bidirectional communications with a secondary storage system (e.g., initial bidirectional communication or re-establishing bidirectional communications), the persistent connection virtualization container may be configured to provide its associated state to the caching service virtualization container.

The UI service virtualization container may receive one or more commands and the one or more commands may include information associated with a destination for the one or more commands. For example, the information may include a specified secondary storage system identifier associated with a secondary storage system (e.g., clusterID of the secondary storage system) that is to receive the one or more commands. The UI service virtualization container may be configured to request from a caching service virtualization container an identifier associated with a persistent connection virtualization container corresponding to a specified secondary storage system identifier associated with a secondary storage system. The caching service virtualization container may respond to the request by inspecting (e.g., a lookup) a data structure stored by the caching service virtualization container to identify a persistent connection virtualization container associated with the secondary storage system that is to receive the one or more commands. For example, the caching service virtualization container may determine an IP address of a persistent connection virtualization container that is associated with the specified secondary storage system identifier associated with a secondary storage system. The caching service virtualization container may then provide the UI service virtualization container the identifier (e.g., IP address) associated with the persistent connection virtualization container corresponding to the specified secondary storage system identifier. The UI service virtualization container may provide the one or more commands to the IP address of the persistent connection virtualization container associated with the secondary storage system.

The connection state information stored by the cache service container helps to ensure that one or more commands from a user associated with a secondary storage system are provided to the correct secondary storage system. In the event a persistent connection virtualization container associated with a user's secondary storage system goes offline, the user associated with the secondary storage system would not be able to properly access and manage a secondary storage system without the cache service container preserving the state associated with bidirectional communications because one or more commands received at a UI service virtualization container may be forward to a wrong persistent connection virtualization container. This may cause problems for the user because the user is unable to access and manage the secondary storage system that the user is authorized to access.

FIG. 1 is a diagram illustrating an embodiment of a system for cluster claim. In the example shown, system 100 includes browser 102, secondary storage system 104, cloud identity provider 106, and cloud service system 108.

Browser 102 is associated with a user device. The user device may be a computer, a laptop, a desktop, a server, a mobile device, a smartphone, a cellular phone, a smart watch, a tablet, a personal data assistant, or any other electronic device capable of running a web browser. Browser 102 may be any web browser capable of browsing the Internet (e.g., Microsoft Internet Explorer, Google Chrome, Mozilla Firefox, Apple Safari, etc.). Browser 102 may enable a user associated with secondary storage system 104 to remotely access and manage secondary storage system 104.

Secondary storage system 104 may be part of a datacenter that is comprised of a primary system and secondary storage system 104. The primary system may be comprised of an object, virtual machine, physical entity, file system, array backup, and/or volume that stores file system data. Secondary storage system 104 may cause the primary system to perform a backup snapshot according to a backup policy and to store the backup snapshot to secondary storage system 104. A backup snapshot represents the state of the primary system at a particular point in time (e.g., the state of the file system data). The backup policy may require a full backup snapshot and/or an incremental backup snapshot to be performed. A full backup snapshot stores the entire state of the primary system at a particular point in time. The file system data is comprised of a plurality of data blocks. The primary system may include a change block tracker that monitors and identifies one or more data blocks of the primary system that have changed (e.g., modified, deleted, added) since the last backup snapshot. An incremental backup snapshot includes the one or more data blocks that have changed since the last backup snapshot.

A user associated with secondary storage system 104 may be permitted to access and manage the one or more backup snapshots stored in secondary storage system 104. For example, a user associated with secondary storage system 104 may be permitted to restore the primary system to a state associated with one of the backup snapshots stored in secondary storage system 104. A user associated with secondary storage system 104 may be permitted to restore to the primary system a file associated with one of the backup snapshots stored in secondary storage system 104. A user associated with the secondary storage system 104 may be permitted to cause the primary system associated with secondary storage system 104 to perform a backup snapshot. A user associated with secondary storage system 104 may delete one of the backup snapshots that is stored on secondary storage system 104.

In some embodiments, the user associated with secondary storage system 104 is associated with a second secondary storage system. The user associated with secondary storage system 104 may be permitted to restore the primary system associated with the second secondary storage system using one of the backup snapshots stored in secondary storage system 104. The user associated with secondary storage system 104 may be permitted to restore the primary system associated with secondary storage system 104 using one of the backup snapshots associated with the second secondary storage system.

A user associated with secondary storage system 104 may remotely access and manage secondary storage system 104. For example, a user associated with secondary storage system 104 may remotely log into secondary storage system 104 via a VPN connection. However, the user associated with secondary storage system 104 may be associated with a plurality of secondary storage systems. For example, an enterprise may have datacenters that include corresponding secondary storage systems located throughout the world for various reasons. To access and manage each of the secondary storage systems, conventional systems may require the user to maintain separate connections for each of the secondary storage systems.

To reduce the number of browser sessions, a user associated with secondary storage system 104 may register secondary storage system 104 with cloud service system 108. The user associated with secondary storage system 104 may also register one or more other secondary storage systems with cloud service system 108. This enables the user to access and manage the secondary storage systems from a single unified portal.

Secondary storage system 104 may be located behind a firewall. As a result, cloud service system 108 cannot directly initiate a connection with secondary storage system 104. However, secondary storage system 104 may initiate a process to connect with cloud service system 108.

A user associated with secondary storage system 104 via browser 102 may enable secondary storage system 104 to communicate with cloud service system 108 and initiate a cluster claim procedure. The user may log into secondary storage system 104 using an internet protocol (IP) address associated with secondary storage system 104 or a virtual IP (VIP) address associated with one of the nodes of the secondary storage system 104. In response to the user enabling secondary storage system 104 to communicate with cloud service system 108 and initiating the cluster claim procedure, secondary storage system 104 may generate cluster state information (e.g., a cluster identifier, a cluster incarnation identifier, the name of a cluster, a security token, and/or a name of a host) that allows cloud service system 108 to register secondary storage system 104. The security token may include a nonce, a one-time password, a reusable password, etc. The name of the host corresponds to the manner in which the user logged into secondary storage system 104. For example, the name of the host may correspond to a VIP address associated with one of the nodes of secondary storage system 104 in the event a user logged into secondary storage system 104 using a VIP address associated with one of the secondary storage system nodes. The name of the host may correspond to an IP address associated with one of the nodes of secondary storage system 104 in the event a user logged into secondary storage system 104 using an IP address associated with one of the secondary storage system nodes. The cluster state information enables cloud service system 108 to identify secondary storage system 104. The cluster state information may be generated by one of the secondary storage system nodes and may be propagated to the other nodes of secondary storage system 104. This allows any of the secondary storage nodes to finish a cluster claim procedure when directed by cloud service system 108.

Secondary storage system is configured to provide the cluster state information to browser 102 and to cause browser 102 to be redirected to cloud identity provider 106. The redirection may include cluster state information associated with secondary storage system 104. For example, the cluster state information may include the cluster identifier, the cluster incarnation identifier, the name of a cluster, the security token (e.g., nonce, a one-time password, reusable password, etc.), and/or the name of a host. The cluster state information included in the redirect may be encrypted using a shared secret that is shared between secondary storage system 104 and cloud service system 108.

Cloud identity provider 106 (e.g., Salesforce) may be an identity provider for a cloud service. Cloud identity provider 106 may store a data structure that maps a user account with one or more secondary storage systems. Cloud identity provider 106 may request the user to provide via browser 102 authentication information associated with the user. For example, the user may provide account information associated with cloud identity provider 106, such as a username and password. The data structure associated with cloud identity provider 106 may associate the received account information with one or more secondary storage systems. The user associated with browser 102 may only access the one or more secondary storage systems that are associated with the received account information.

Upon successful authentication, cloud identity provider 106 may redirect browser 102 to cloud service system 108. The redirection may include the cluster state information and a validation code. Browser 102 is configured to provide the cluster state information and the validation code to cloud service system 108. The cluster state information may be encrypted. Cloud service system 108 may decrypt the encrypted cluster state information using the shared secret. Cloud service system is configured to store the cluster state information. Cloud service system 108 may be configured to store the cluster state information for a predetermined period of time (e.g., 15 minutes). In the event a connection is not established between cloud service system 108 and secondary storage system 104, cloud service system 108 is configured to delete the cluster state information. In the event cloud service system 108 is unable to decrypt the encrypted cluster state information, cloud service system 108 may terminate the cluster claim procedure. This indicates that the cluster claim procedure was not initiated by a valid secondary storage system.

Cloud service system 108 is configured to provide the validation code to cloud identity provider 106 and to request an access token from the cloud identity provider 106. The cloud identity provider may validate the validation code by comparing the validation code with the validation code provided in the browser redirect. The validation code is validated in the event the validation code received from the cloud service system matches the validation code provided in the browser redirect. Upon validating the validation code, cloud identity provider 106 is configured to provide the access token to cloud service system 108. In response to receiving the access token, cloud service system 108 is configured to request user information based on one or more parameters. The parameter may be the access token. Cloud identity provider 106 is configured to provide user information to cloud service system 108. The user information includes account information associated with the authentication information provided by the user. The account information may indicate the one or more secondary storage systems associated with a user. Cloud service system 108 may be configured to verify that the user information matches the cluster state information. For example, cloud service system 108 may be configured to verify that a cluster identifier included in the user information matches the cluster identifier included in the cluster state information. In the event the user information does not match the cluster state information, cloud service system 108 is configured to terminate the cluster claim procedure. In the event the user information matches the cluster state information, cloud service system 108 is configured to redirect browser 102 to the cluster having the host name included in the cluster state information. Browser 102 may be redirected to a node of secondary storage system 104 based on the manner in which the user logged into secondary storage system 104. For example, browser 102 is redirected to a VIP address associated with a secondary storage node in the event the user logged into the secondary storage system using the VIP address associated with a secondary storage node. In other embodiments, browser 102 is redirected to an IP address associated with a secondary storage node in the event the user logged into secondary storage system 104 using the IP address associated with the secondary storage node.

The redirect may cause the secondary storage system to which browser 104 is directed to finish the cluster claim procedure. The cluster claim procedure may be finished by any of the nodes of secondary storage system 104 even though the host name is associated with one of the secondary storage nodes because the cluster state information has been synced to all of the secondary storage nodes. The secondary storage node handling the redirect may request a certificate from cloud service system 108 and provide the cluster state information to the cloud service system 108. The cluster state information may be encrypted. Cloud service system 108 may compare the instance of the security token included in the cluster state information received from secondary storage system 104 to the instance of the security token included in the cluster state information received from browser 102 via the cloud identity provider 106 redirect.

In the event the second instance of the security token matches the first instance of the security token, cloud service system 108 is configured to provide a certificate to secondary storage system 104. The certificate may enable secondary storage system 104 to communicate with cloud service system 108. In some embodiments, the instance of the security token received from the cloud identity provider 106 via browser 102 is valid for a predetermined duration (e.g., 15 mins). In the event cloud service system 108 does not receive a security token from a secondary storage system that matches the security token received from cloud identity provider 106 via browser 102 within the predetermined duration, cloud service system 108 is configured to deny a cluster claim. The secondary storage system is configured to store the certificate.

The certificate is signed by cloud service system 108. The certificate may be provided back to cloud service system 108 to allow cloud service system 108 to verify that secondary storage system 104 can be trusted because it possesses a certificate that was signed by cloud service system 108. In the event the instance of the security token received from secondary storage system 104 does not match the instance of the security token received from cloud identity provider 106 via browser 102, cloud service system 108 does not provide a certificate to secondary storage system 104 and a connection cannot be established between the secondary storage system of secondary storage system 104 and cloud service system 108. Upon receiving the certificate, secondary storage system 104 is configured to store the certificate. Secondary storage system 104 includes a distributed store and the received certificate is stored in the distributed store. Secondary storage system 104 is comprised of a master storage node and a plurality of secondary storage nodes. In the event the master storage node is offline, one of the remaining storage nodes may re-establish communications with cloud service system 108 using the certificate that is stored in the distributed store.

In response to receiving the certificate, secondary storage system 104 is configured to redirect browser 102 to the initial login page, to provide a notification indicating that the cluster claim procedure was successful, and to establish bidirectional communications between secondary storage system 104 and cloud service system 108. The notification indicates that the cluster claim was successful, i.e., secondary storage system 104 is registered with cloud service system 108. In the event the cluster claim is successful, the user may access secondary storage system 104 via cloud service system 108 without having to establish a VPN connection with secondary storage system 104. The user may perform the same procedure for a plurality of other secondary storage systems. Subsequently, the user may manage the one or more secondary storage systems via a single browser session.

Figure 2:
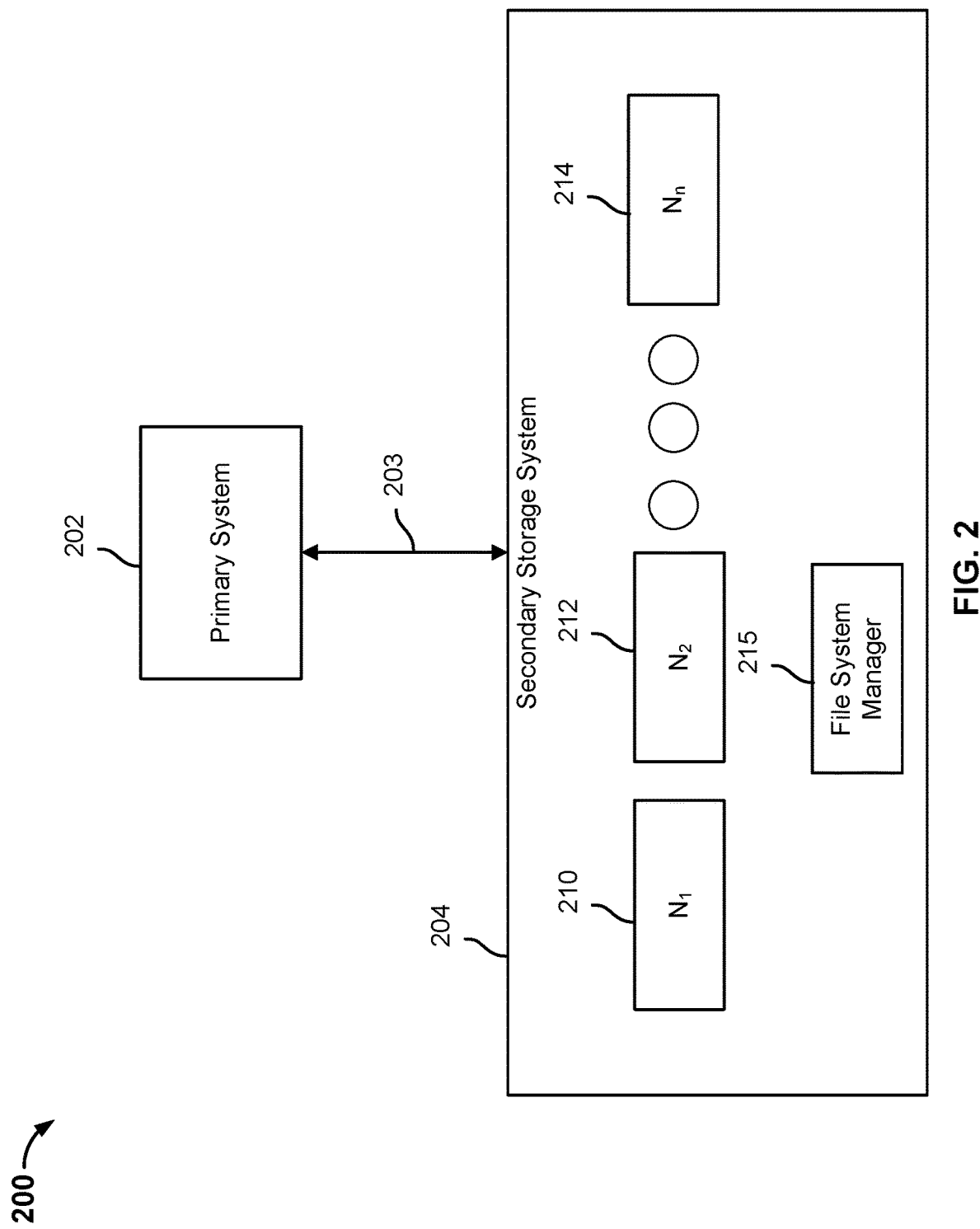
FIG. 2 is a diagram illustrating an embodiment of a datacenter.

FIG. 2 is a diagram of illustrating an embodiment of a datacenter. In the example shown, datacenter 200 includes primary system 202 and secondary storage system 204 connected via a network 203.

Primary system 202 is a computing system that stores file system data. Primary system 202 may be comprised of one or more servers, one or more computing devices, one or more storage devices, and/or a combination thereof. In response to one or more commands received from secondary storage system 204, primary system 202 may perform a backup snapshot of the one or more storage volumes of primary system 202 to secondary storage system 204.

The backup snapshot may be a full backup snapshot or an incremental backup snapshot. Each storage volume of the primary system is comprised of file system data. A full backup snapshot includes a copy of the entire file system data of the storage volume to be backed up. An incremental backup snapshot stores the file system data that was not previously backed up.

Primary system 202 may be configured to backup file system data to secondary storage system 204 according to one or more backup policies associated with secondary storage system 204. In some embodiments, a backup policy indicates that file system data is to be backed up on a periodic basis (e.g., hourly, daily, weekly, monthly, etc.). In other embodiments, a backup policy indicates that file system data is to be backed up when a threshold size of data has changed. In other embodiments, a backup policy indicates that file system data is to be backed up upon a command from a user associated with primary system 202. For example, a user associated with primary system 202 may cause a backup snapshot to be performed via a cloud service system. The file system data may be sent from primary system 202 to secondary storage system 204 via a network 203. Network 203 may be one or more of the following: a local area network, a wide area network, a wired network, a wireless network, the Internet, an intranet, or any other appropriate communication network.

Secondary storage system 204 is configured to receive and backup file system data from primary system 202. Secondary storage system 204 may protect a large volume of applications while supporting tight business requirements (recovery time objective (RTO) and recovery point objective (RPO)). Secondary storage system 204 may unify end-to-end protection infrastructure—including target storage, provide backup, replication of data, disaster recover, and/or cloud tiering. Secondary storage system 204 may provide scale-out, globally deduped, highly available storage to consolidate all secondary data, including backups, files, and test/dev copies. Secondary storage system simplifies backup infrastructure and eliminates the need to run separate backup software, proxies, media servers, and archival. Secondary storage system 104 may be fully integrated with a virtual machine (VM) centralized management tool, such as vCenter, and an applications programming interface (API) for data protection. Secondary storage system may reduce the amount of time to perform a RPOs and support instantaneous RTOs by creating a clone of a backup VM and running the VM directly from secondary storage system 104. Secondary storage system 204 may integrate natively with one or more cloud servers. This eliminates the need to use tape archives by using one or more cloud servers for long-term data archival.

Data for the backup snapshot may be received at secondary storage system 204. Secondary storage system 204 is configured to store the file system data and organize the file system data in a tree data structure. An example of the tree data structure is a snapshot tree (e.g., Cohesity Snaptree), which may be based on a B+ tree structure (or other type of tree structure in other embodiments). The file system data may include metadata associated with the file system data, a plurality of content files, and metadata associated with the content files. The secondary storage system may create a file system metadata snapshot tree for the backup snapshot. The metadata associated with the plurality of content files may be organized using a snapshot tree and stored in a key value store (KVS). The file system metadata snapshot tree for the backup snapshot corresponds to a version of the storage volume(s) at a particular moment in time. The secondary storage system may also create a file tree corresponding to a content file included in the backup snapshot. The file tree is a file metadata structure. The file tree may store the metadata associated with the file corresponding to the file tree. A leaf node of the file system metadata snapshot tree may include a pointer to one of the file trees, linking the contents of a content file to the file system metadata snapshot tree. A leaf node of a file tree may include a pointer to a brick storing one or more data chunks associated with a content file. A leaf node of the snapshot tree may be configured to store a key-value pair of metadata. The key-value pairs of metadata (e.g., log sequence numbers, file name, creation date, offline/online status, etc.) may be stored in the KVS.

A file system metadata snapshot tree is a tree data structure and is comprised of a root node, one or more levels of intermediate nodes, and one or more leaf nodes. In some embodiments, a file system metadata snapshot tree is comprised of a root node and one or more leaf nodes. The root node is the starting point of a file system metadata snapshot tree and may include pointers to one or more other nodes. The root node includes an identifier that indicates a view (e.g., backup snapshot) with which the root node is associated. An intermediate node is a node to which another node points (e.g., root node, other intermediate node) and includes one or more pointers to other nodes. A leaf node is a node at the bottom of a file system metadata snapshot tree. In some embodiments, a leaf node is configured to store key-value pairs of file system metadata associated with the storage volume(s). In some embodiments, a leaf node includes a pointer to a file tree. For example, a leaf node of a file system metadata snapshot tree storing metadata associated with the storage volume(s) may include a pointer to a root node of a file tree storing data associated with a content file. In some embodiments, a leaf node of a file system metadata snapshot tree or a leaf node of a file tree includes a pointer to or an identifier of a physical location storing data. For example, the physical location may be a brick storing one or more data chunks and the identifier may be a brick number corresponding to the brick storing one or more data chunks of the content file. Each node of the tree structure includes an identifier that identifies a view/backup snapshot (file system metadata snapshot tree or file tree) with which the node is associated (e.g., TreeID).

The tree data structure may be used to capture different versions of the storage volume(s) at different moments in time. A backup snapshot received from a primary system may include data associated with a first version of the storage volume(s) at a first point in time and a subsequent backup snapshot received from the primary system may include data associated with the second version of the storage volume(s) at a second point in time. Each version of the volume(s) may be represented in a corresponding file system metadata snapshot tree. The tree data structure allows a chain of file system metadata snapshot trees (i.e., each corresponding file system metadata snapshot tree) to be linked together by allowing a node of a later version of a file system metadata snapshot tree corresponding to a later version of the storage volume(s) to reference a node of a previous version of the file system metadata snapshot tree corresponding to an earlier version of the storage volume(s). The tree data structure allows a chain of file trees (i.e., each corresponding file tree) to be linked together by allowing a node of a later version of a file tree corresponding to a later version of a content file to reference a node of a previous version of the file tree corresponding to an earlier version of the content file.

Each time data for an incremental backup snapshot of the storage volume(s) is received, a new file system metadata snapshot tree is added to the corresponding tree data structure by creating a new root node. The new root node may be a clone of the root node associated with a previous file system metadata snapshot tree. Initially upon creation, the new root node includes the set of pointers included in the previous root node, that is, the new root node includes one or more pointers to an intermediate node or leaf node that was specified in the root node of a previous file system metadata snapshot tree associated with a previous backup. However, among other differences, the new root node includes a node identifier and a view identifier that is different than the node identifier and view identifier of the previous root node. The new file system metadata snapshot tree may be modified to reflect the data included in the backup of the storage volume(s) (e.g., adding one or more intermediate nodes, adding one or more leaf nodes, updating pointers associated with nodes).

A file system metadata snapshot tree is a representation of a fully hydrated backup because it provides a complete view of the storage volume(s) at a particular moment in time. A fully hydrated backup is a backup that is ready for use without having to reconstruct a plurality of backups to use it. Conventional systems may reconstruct a backup by starting with a full backup and applying one or more changes associated with one or more incremental backups to the data associated with the full backup. In contrast, any file stored in the storage volume at a particular time and the file's contents, for which there is an associated backup, may be determined from the file system metadata snapshot tree, regardless if the associated backup snapshot was a full backup snapshot or an incremental backup snapshot. Creating an incremental backup snapshot may only include copying data of the storage volume(s) that was not previously backed up. However, the file system metadata snapshot tree corresponding to the incremental backup snapshot provides a complete view of the storage volume(s) at the particular moment in time because it includes references to data of the storage volume that was previously stored. For example, a root node associated with the file system metadata snapshot tree may include one or more references to leaf nodes associated with one or more previous backup snapshots and one or more references to leaf nodes associated with the current backup snapshot. This provides significant savings in the amount of time needed to restore or recover a storage volume and/or a database. In contrast, traditional recovery/restoration methods may require significant time, storage, and computational resources to reconstruct a particular version of a volume or database from a full backup and a series of incremental backups.

Secondary storage system 204 may be comprised of one or more solid state drives, one or more hard disk drives, or a combination thereof. Secondary storage system 204 may include file system manager 215. File system manager 215 is configured to maintain file system data in the form of nodes arranged in a tree data structure. In some embodiments, leaf nodes in the file system tree include key-value pairs that associate data keys with values in the form of particular items of file system data. File system manager 215 may be configured to perform one or more modifications to a snapshot tree. File system data may include data associated with one or more content files and metadata associated with the one or more content files. The metadata may include information, such as file size, directory structure, file permissions, physical storage location of the content files, time of last access, time of last modification, etc. The metadata values for the one or more content files may be stored in a KVS.

The secondary storage system 204 includes a first storage node 210, a second storage node 212, and an nth storage node 214. In some embodiments, n is an odd number. Each storage node may include a corresponding disk storage, a corresponding KVS, a corresponding processor, and a corresponding memory. A user associated with secondary storage system 204 may log into one of the storage nodes 210, 212, 214 and enable the cluster claim procedure. The user may log into one of the secondary storage system nodes using an IP address associated with the secondary storage system or a VIP address associated with one of the nodes of secondary storage system 204. In response to the user enabling the cluster claim procedure, secondary storage system 204 may generate cluster state information (e.g., a cluster identifier, a cluster incarnation identifier, the name of a cluster, a security token, and/or a name of a host) that allows a cloud service system to register secondary storage system 204. The security token may include a nonce, a one-time password, a reusable password, etc. The name of the host corresponds to the manner in which the user logged into secondary storage system 204. For example, the name of the host may correspond to a VIP address associated with one of the nodes of secondary storage system 204 in the event a user logged into secondary storage system 204 using a VIP address associated with one of the secondary storage system nodes. The name of the host may correspond to an IP address associated with one of the nodes of secondary storage system 204 in the event a user logged into secondary storage system 204 using an IP address associated with one of the secondary storage system nodes. The cluster state information generated by one of the nodes is shared with the other nodes of secondary storage system 204.

A browser redirect may cause secondary storage system 204 to finish the cluster claim procedure. The cluster claim procedure may be finished by any of the nodes of secondary storage system 204 because the cluster state information generated by one of the nodes has been shared with all of the secondary storage system nodes. The secondary storage node handling the redirect may request a certificate from a cloud service system and provide the cluster state information to the cloud service system. The cluster state information may be encrypted. The cloud service system may compare the instance of the security token included in the cluster state information received from secondary storage system 204 to the instance of the security token included in the cluster state information received from a browser via a cloud identity provider redirect. In the event the second instance of the security token matches the first instance of the security token, the cloud service system is configured to provide a certificate to secondary storage system 204. The certificate may enable secondary storage system 204 to communicate with the cloud service system. In some embodiments, the instance of the security token received from the cloud identity provider is valid for a predetermined duration (e.g., 15 mins). In the event the cloud service system does not receive a security token from secondary storage system 204 that matches the security token received from the browser via the cloud identity provider redirect within the predetermined duration, the cloud service system is configured to deny a cluster claim.

Secondary storage system 204 is configured to store the certificate. In response to receiving the certificate, secondary storage system 204 is configured to redirect a browser to the initial login page, to provide a notification indicating that the cluster claim procedure was successful, and to establish bidirectional communications between secondary storage system 204 and the cloud service system. In the event the cluster claim is successful, the user may access secondary storage system 204 via the cloud service system without having to establish a VPN connection with the cluster.

Each storage node 210, 212, 214 maintains a portion of the KVS. The key-value pairs of the KVS may be grouped into a plurality of buckets. Each node of the plurality of storage nodes includes a local KVS that stores a portion of the KVS, i.e., at least one of the plurality of buckets. Keys may be assigned to a storage node using a hashing function that generally distributes keys equally across the nodes. A master node of the plurality of storage nodes may be configured to store a master table. The master table matches a key-value pair to a storage node. Secondary storage system 204 may receive a file operation (e.g., write/read operation). The master node may inspect the master table and direct the file operation to the storage node associated with the file operation, i.e., the node that will handle the file operation.

At least one storage node in secondary storage system 204 may be designated as a backup node for the portion of the KVS that is stored on another storage node of the secondary storage system 204. For example first storage node 210 may store keys $k_{11}$ to $k_{1n}$. At least one copy of keys $k_{11}$ to kin may be stored on the second storage node 212, the nth storage node 214, or any of the storage nodes between the second storage node 212 and the nth storage node 214. This provides fault tolerance and consistency for the distributed computing system in the event of a node failure. Multiple copies of keys may be stored across multiple storage nodes to increase the fault tolerance of the distributed computing system. In some embodiments, each key of the KVS is stored across a majority of the storage nodes.

Figure 3:
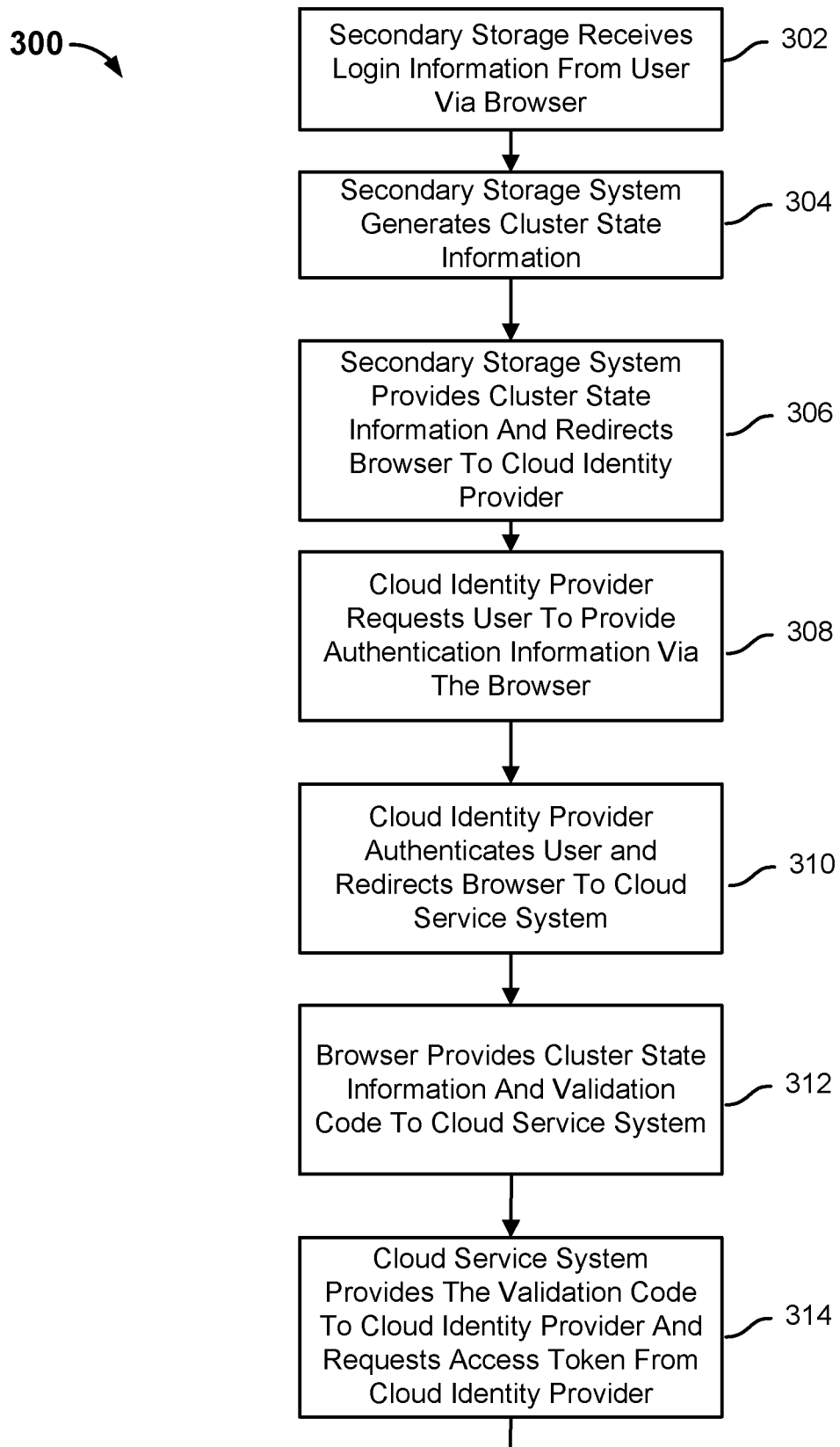
FIG. 3 is an example of an embodiment of a process for cluster claim.
Figure 3:
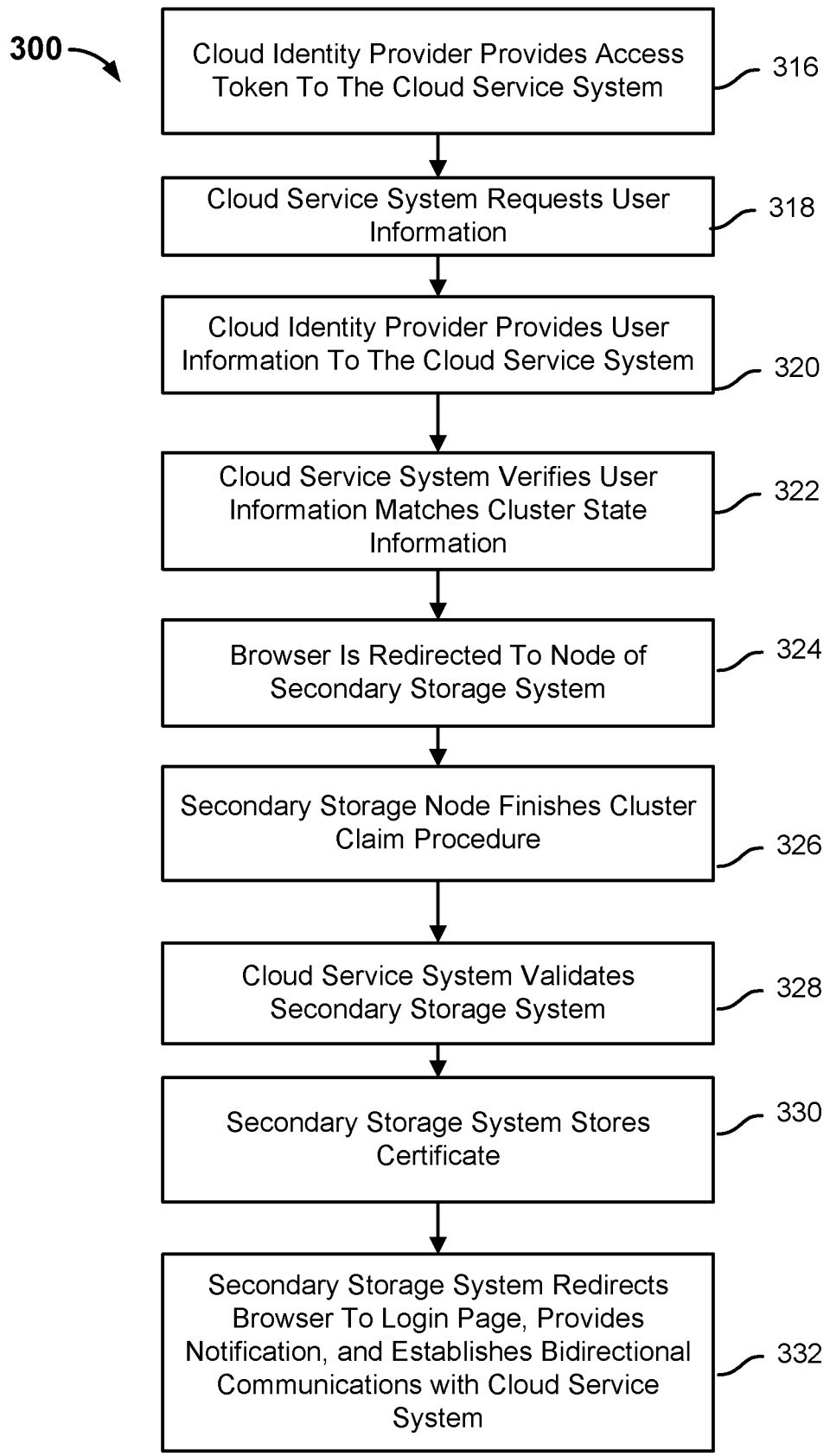

FIG. 3 is an example of an embodiment of a process for cluster claim. In the example shown, process 300 may be performed by a system for cluster claim, such as system 100.

At 302, login information is received at a secondary storage system from a user via a browser. The user may log into the secondary storage system using an internet protocol (IP) address associated with the secondary storage system or a virtual IP (VIP) address associated with one of the nodes of the secondary storage system.

In response to a successful login, the secondary storage system may provide a user interface that allows the user to enable a cluster claim. A cluster claim is a procedure that enables a user to access and manage one or more secondary storage systems via a cloud service system. A user may enable a cluster claim via the browser associated with the user device.

A user associated with the secondary storage system may be associated with a plurality of secondary storage systems. The secondary storage systems may be remote from each other. Instead of establishing a separate browser session with each secondary storage system to manage each secondary storage system, the user may desire to interact with the plurality of secondary storage systems using a single browser session.

At 304, the secondary storage system generates the cluster state information in response to the user enabling the cluster claim. The cluster state information may include a cluster identifier, a cluster incarnation identifier, a name of a cluster, a security token (e.g., nonce, a one-time password, reusable password, etc.), and/or a name of a host. The name of the host corresponds to the manner in which the user logged into the secondary storage system. For example, the name of the host may correspond to a VIP address associated with one of the nodes of the secondary storage system in the event a user logged into the secondary storage system using a VIP address associated with one of the secondary storage system nodes. The name of the host may correspond to an IP address associated with one of the nodes of the secondary storage system in the event a user logged into the secondary storage system using an IP address associated with one of the secondary storage system nodes. A storage node of the secondary storage system is configured to generate the cluster state information and to propagate the generated cluster state information to the other nodes of the secondary storage systems. This enables any of the secondary storage system nodes to complete the cluster claim procedure when directed by a cloud service system. The cluster state information allows the cloud service system to identify a secondary storage system that is requesting a cluster claim to be established.

At 306, cluster state information is provided from the secondary storage system to the browser associated with a user and the browser associated with the user is redirected to a cloud identity provider. In some embodiments, the provided cluster state information is encrypted using a shared secret that is shared between a secondary storage system and a cloud service system. This prevents non-authorized users from attempting to register the secondary storage system.

At 308, the cloud identity provider requests the user to provide authentication information via the browser. For example, the user may provide account information associated with the cloud identity provider, such as a username and password. The user logs into the cloud identity provider and the browser associated with the user provides the cluster state information to the cloud identity provider. The account information associated with the cloud identity provider may be associated with one or more secondary storage systems. A user may only access the one or more secondary storage systems to which the account information associated with the cloud identity provider is associated.

At 310, the cloud identity provider authenticates the user and redirects the browser associated with the user to a cloud service system. The redirect includes the cluster state information and a validation code.

At 312, the browser associated with the user provides the cluster state information and the validation code to the cloud service system. The cluster state information may be encrypted. The cloud service system may decrypt the encrypted cluster state information using the shared secret. The cloud service system is configured to store the cluster state information. In the event the cloud service system is unable to decrypt the encrypted cluster state information, the cloud service system may terminate the cluster claim procedure. This indicates that the cluster claim procedure was not initiated by a valid secondary storage system.

At 314, the cloud service system provides the validation code to the cloud identity provider and requests an access token from the cloud identity provider.

At 316, in response to validating the validation code, the cloud identity provider provides the access token to the cloud service system. At 318, in response to receiving the access token, the cloud service system requests user information based on one or more parameters. The parameter may be the access token. At 320, the cloud identity provider provides user information to the cloud service system. The user information includes account information associated with the authentication information provided by the user. The account information may indicate the one or more secondary storage systems associated with a user.

At 322, the cloud service system is configured to verify that the user information matches the cluster state information. For example, the cloud service system may be configured to verify that a cluster identifier included in the user information matches the cluster identifier included in the cluster state information. In the event the user information does not match the cluster state information, the cloud service system is configured to terminate the cluster claim procedure. In the event the user information matches the cluster state information, the cloud service system is configured to redirect the browser associated with the user to the cluster having the host name included in the cluster state information.

At 324, the browser associated with the user is redirected to a node of the secondary storage system based on the manner in which the user logged into the secondary storage system. For example, the browser associated with the user is redirected to a VIP address associated with a secondary storage node in the event the user logged into the secondary storage system using the VIP address associated with a secondary storage node. In other embodiments, the browser associated with the user is redirected to an IP address associated with a secondary storage node in the event the user logged into the secondary storage system using the IP address associated with the secondary storage node.

At 326, the redirect may cause the secondary storage system to which the browser is directed to finish the cluster claim procedure. The cluster claim procedure may be finished by any of the nodes of the secondary storage system even though the host name is associated with one of the secondary storage nodes because the cluster state information has been synced to all of the secondary storage nodes.

The secondary storage node handling the redirect may request a certificate from the cloud service system and provide the cluster state information to the cloud service system. The cluster state information may be encrypted.

At 328, the cloud service system is configured to validate the secondary storage system at least in part by comparing the second instance of the security token included in the cluster state information received from the secondary storage system to the first instance of the security token included in the cluster state information received from the browser via the cloud identity provider redirect. In the event the second instance of the security token matches the first instance of the security token, the cloud service system is configured to provide a certificate to the secondary storage system. The certificate may enable the secondary storage system to communicate with the cloud service system. In some embodiments, the instance of the security token received from the cloud identity provider is valid for a predetermined duration (e.g., 15 mins). In the event the cloud service system does not receive a security token from a secondary storage system that matches the security token received from the cloud identity provider within the predetermined duration, the cloud service system is configured to deny a cluster claim.

At 330, the secondary storage system is configured to store the certificate. The secondary storage system includes a distributed store and the received certificate is stored in the distributed store. The secondary storage system is comprised of a master storage node and a plurality of secondary storage nodes. In the event the master storage node is offline, one of the remaining storage nodes may re-establish communications with the cloud service system using the certificate that is stored in the distributed store.

At 332, the secondary storage system is configured to redirect the browser to the initial login page, to provide a notification indicating that the cluster claim procedure was successful, and to establish bidirectional communications between the secondary storage system and the cloud service system.

In the event the cluster claim is successful, the user may access and manage the secondary storage system via the cloud service system without having to establish a VPN connection with the secondary storage system. The user may perform the same procedure for a plurality of other secondary storage systems. Subsequently, the user may manage the plurality of secondary storage systems via a single browser session.

Figure 4:
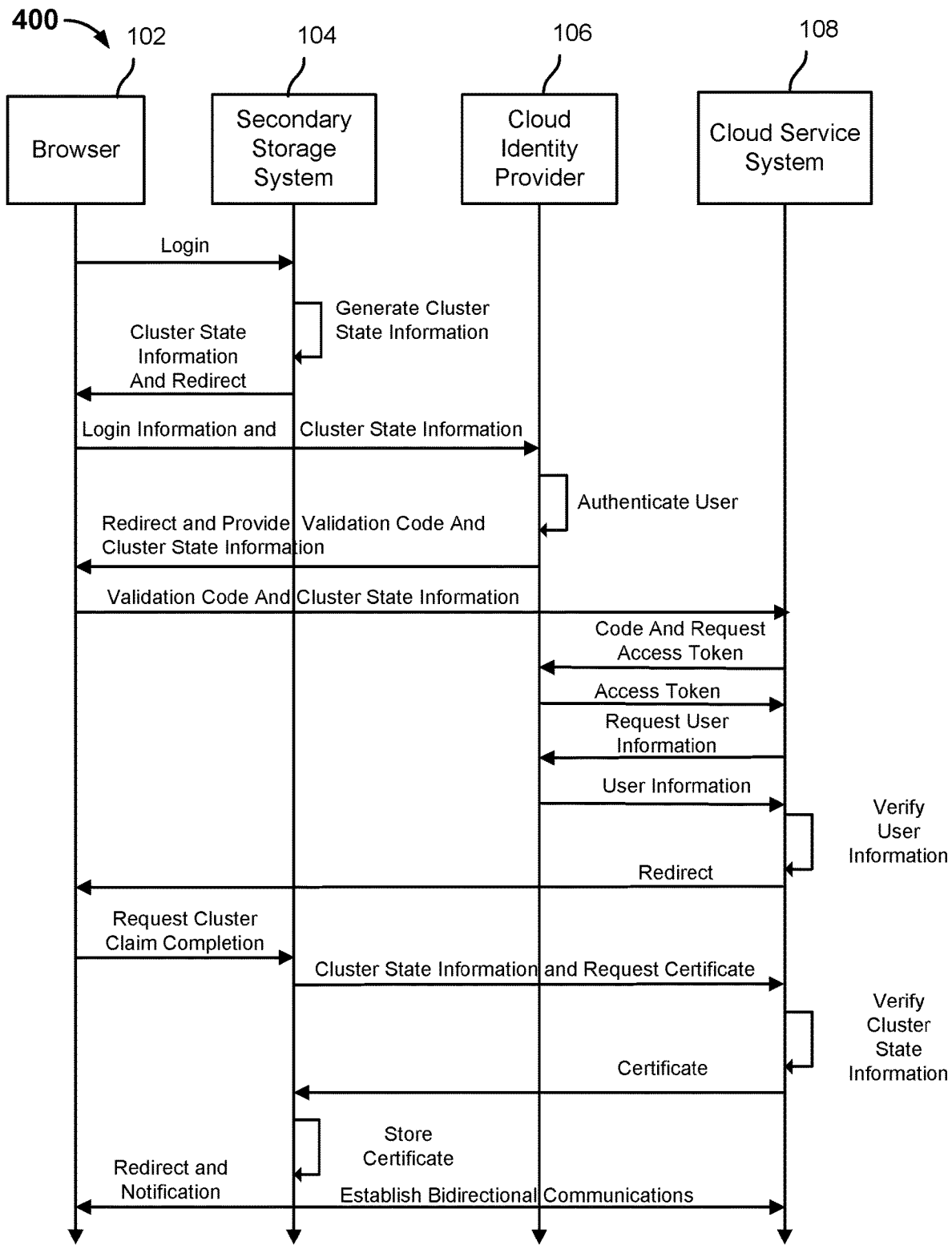
FIG. 4 is a diagram illustrating an embodiment of a timeline of a cluster claim procedure.

FIG. 4 is a diagram illustrating an embodiment of a timeline of a cluster claim procedure. In the example shown, timeline 400 may be implemented by a system for cluster claim, such as system 100.

Browser 102 logs into secondary storage system 104. A user associated with browser 102 may log into secondary storage system 104 using an internet protocol (IP) address associated with the secondary storage system or a virtual IP (VIP) address associated with one of the nodes of the secondary storage system. In response to a successful login, secondary storage system 104 may provide a user interface that allows a user associated with browser 102 to enable a cluster claim.

Secondary storage system 104 is configured to generate cluster state information in response to the user enabling the cluster claim. The cluster state information may include a cluster identifier, a cluster incarnation identifier, a name of a cluster, a security token (e.g., nonce, a one-time password, reusable password, etc.), and/or a name of a host. The cluster state information allows cloud service system 108 to identify a secondary storage system of a data center that is requesting a cluster claim to be established. The name of the host corresponds to the manner in which the user logged into the secondary storage system. For example, the name of the host may correspond to a VIP address associated with one of the nodes of the secondary storage system in the event a user logged into the secondary storage system using a VIP address associated with one of the secondary storage system nodes. The name of the host may correspond to an IP address associated with the secondary storage system in the event a user logged into the secondary storage system using an IP address associated with the secondary storage system. The cluster state information may be generated by one of the secondary storage system nodes and propagated to the other nodes of the secondary storage system. This allows any of the secondary storage nodes to finish a cluster claim procedure when directed by the cloud service system.

Secondary storage system 104 provides the cluster state information to browser 102 and browser 102 is redirected to a cloud identity provider 106. The cluster state information may be encrypted using a shared secret that is shared between secondary storage system 104 and cloud service system 108. Cloud identity provider 106 requests the user to provide authentication information via the browser 102. For example, the user may provide account information associated with cloud identity provider 106, such as a username and password.

The user logs into cloud identity provider 106 and browser 102 provides the cluster state information to cloud identity provider 106. The account information associated with the cloud identity provider may be associated with one or more secondary storage systems. A user may only access the one or more secondary storage systems to which the account information associated with the cloud identity provider is associated.

Cloud identity provider 106 authenticates the user. For example, the user may provide account information associated with the cloud identity provider, such as a username and password. The account information associated with the cloud identity provider may be associated with one or more secondary storage systems. A user may only access the one or more secondary storage systems to which the account information is associated.

Cloud identity provider 106 redirects browser 102 to cloud service system 108. The redirect includes the cluster state information and a validation code.

Browser 102 provides the cluster state information and the validation code to cloud service system 108. The cluster state information may be encrypted. The cloud service system may decrypt the encrypted cluster state information using the shared secret. The cloud service system is configured to store the cluster state information. In the event the cloud service system is unable to decrypt the encrypted cluster state information, the cloud service system may terminate the cluster claim procedure. This indicates that the cluster claim procedure was not initiated by a valid secondary storage system.

Cloud service system 108 provides the validation code to cloud identity provider 106 and to request an access token from cloud identity provider 106. Cloud identity provider 106 may validate the validation code by comparing the validation code with the validation code provided in the browser redirect. The validation code is validated in the event the validation code received from cloud service system 108 matches the validation code provided in the browser 102 redirect.

Upon validating the validation code, cloud identity provider 106 provides the access token to cloud service system 108.

In response to receiving the access token, cloud service system 108 is configured to request user information based on one or more parameters. The parameter may be the access token.

Cloud identity provider 108 is configured to provide user information to cloud service system 108. The user information includes account information associated with the authentication information provided by the user. The account information may indicate the one or more secondary storage systems associated with a user.

Cloud service system 108 verifies that the user information matches the cluster state information. For example, the cloud service system may be configured to verify that a cluster identifier included in the user information matches the cluster identifier included in the cluster state information. In the event the user information does not match the cluster state information, cloud service system 108 is configured to terminate the cluster claim procedure. In the event the user information matches the cluster state information, cloud service system 108 is configured to redirect the browser 108 to the secondary storage system having the host name included in the cluster state information.

Browser 102 is redirected to a node of secondary storage system 104 based on the manner in which the user logged into secondary storage system 104. For example, the browser associated with the user is redirected to a VIP address associated with a secondary storage node in the event the user logged into secondary storage system 104 using the VIP address associated with a secondary storage node. In other embodiments, browser 102 is redirected to an IP address associated with a secondary storage node in the event the user logged into secondary storage system 104 using the IP address associated with the secondary storage node.

The redirect causes secondary storage system 104 to finish the cluster claim procedure. The cluster claim procedure may be finished by any of the nodes of the secondary storage system even though the host name is associated with one of the secondary storage nodes because the cluster state information has been synced to all of the secondary storage nodes.

The secondary storage node of secondary storage system 104 handling the redirect may request a certificate from cloud service system 108 and provide the cluster state information to the cloud service system 108. The cluster state information may be encrypted. The cloud service system may compare the second instance of the security token included in the cluster state information received from the secondary storage system to the first instance of the security token included in the cluster state information received from the browser via the cloud identity provider redirect.

In the event the second instance of the security token matches the first instance of the security token, cloud service system 108 is configured to provide a certificate to secondary storage system. The certificate may enable secondary storage system 108 to communicate with cloud service system 108. In some embodiments, the instance of the security token received from browser 102 via cloud identity provider 106 is valid for a predetermined duration (e.g., 15 mins). In the event cloud service system 108 does not receive a security token from a secondary storage system that matches the security token received from the cloud identity provider within the predetermined duration, the cloud service system is configured to deny a cluster claim. Secondary storage system 104 stores the certificate.

In response to receiving the certificate, the secondary storage system is configured to redirect browser 102 to the initial login page, to provide a notification indicating that the cluster claim procedure was successful, and to establish bidirectional communications between secondary storage system 104 and cloud service system 108. In the event the cluster claim is successful, the user may access the secondary storage system via the cloud service system without having to establish a VPN connection with the cluster. The user may perform the same procedure for a plurality of other secondary storage systems. Subsequently, the user may manage the one or more secondary storage systems via a single browser session.

Figure 5A:
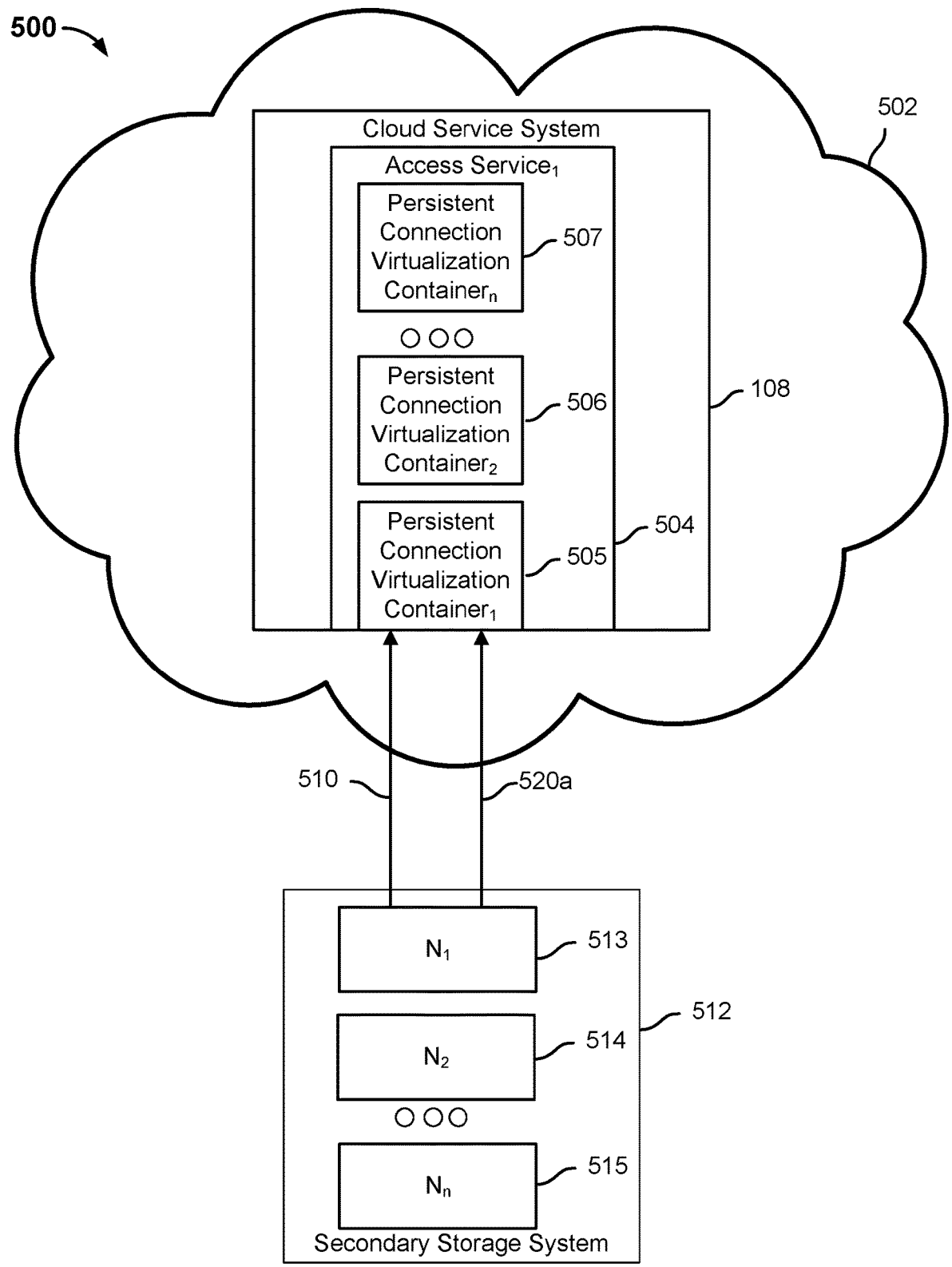
FIG. 5A is a diagram illustrating a system for bidirectional communications in accordance with some embodiments.

FIG. 5A is a diagram illustrating a system for bidirectional communications in accordance with some embodiments. In the example shown, system 500 includes cloud service system 108 hosted in cloud 502 and a secondary storage system 512. Cloud 502 may be a public cloud provider (e.g., Amazon Web Services, Microsoft Azure, Google Cloud, etc.). Cloud service system 108 is comprised of one or more access services, such as access service 504. An access service may be hosted on one or more servers hosted in cloud 502. An access service may include one or more persistent connection virtualization containers. For example, access service 504 includes a first persistent connection virtualization container 505, a second persistent connection virtualization container 506, and an nth persistent connection virtualization container 507. Each of the plurality of persistent connection virtualization containers has a corresponding IP address and may be assigned to a particular secondary storage system. A container (e.g., Kubernetes container, containerization, container-based virtualization) may be configured to implement a virtual instance of a single application or micro service (e.g., pod). Persistent connection virtualization container 505 may be configured to receive data from secondary storage system 512 and to forward the received data to another container associated with cloud service system 108. Persistent connection virtualization container 505 may be configured to receive a request from another container (e.g., a user interface virtualization container) associated cloud service system 108 and to forward the request to secondary storage system 512.

The cluster claim process may result in first persistent connection pipe 510 and second persistent connection pipe 520a being established between persistent connection virtualization container 505 and a master node (in this example, node $N_1$ 513) of secondary storage system 512. Before first persistent connection pipe 501 and second persistent connection pipe 520a are established, secondary storage system 512 must verify that persistent connection virtualization container 505 is a trusted persistent connection virtualization container and persistent connection virtualization container 505 must verify that secondary storage system 512 is the secondary storage system that initiated the cluster claim process.

Master node 513 may request to establish first persistent connection pipe 510 with persistent connection virtualization container 505. In response to the request, persistent connection virtualization container 505 may provide a certificate associated with cloud service system 108. The certificate may include a public key associated with cloud service system 108 and a signature signed by a trusted third party (e.g., Veritas). The signature is encrypted using a private key associated with the trusted third party. The public key associated with cloud service system 108 may be used by master node 513 to encrypt data that is sent to persistent connection virtualization container 505. Master node 513 may verify the certificate by decrypting the encrypted signature using a public key of the trusted third party. For example, a browser associated with master node 513 may include a list of trusted authentication third parties and their corresponding public keys.

Persistent connection virtualization container 505 may request master node 513 to provide a certificate. Secondary storage systems typically do not have their own certificate because it costs time and money for a trusted third party to generate and sign the certificate for the secondary storage system. However, secondary storage system 512 may store a certificate that was provided during the cluster claim process. That certificate may be signed by cloud service system 108 and encrypted using a private key associated with cloud service system 108. Master node 513 may provide to persistent connection virtualization container 505 the certificate that was provided during the cluster claim process. In response to receiving the certificate, persistent connection virtualization container 505 may verify the certificate and verify that master node 513 is part of a registered secondary storage system. In the event master node 513 does not provide a valid certification, persistent connection virtualization container 505 may reject the connection request. This may prevent unauthorized secondary storage systems from communicating with persistent connection virtualization container 505.

After master node 513 and persistent connection virtualization container 505 verify the corresponding certificates, first persistent connection pipe 510 may be established between master node 513 and persistent connection virtualization container 505. Other nodes of secondary storage system 512 may exchange certificates with persistent connection virtualization container 505 to re-establish first persistent connection pipe 510 in the event the master node 513 goes offline. In that scenario, first persistent connection pipe 510 would be established from one of the other nodes of secondary storage system 512 to persistent connection virtualization container 505.

First persistent connection pipe 510 may be established from secondary storage system 512 to persistent connection virtualization container 505. First persistent connection pipe 510 is a unidirectional connection, that is, a request may be initiated by secondary storage system 512 and sent to persistent connection virtualization container 505. The response from persistent connection virtualization container 505 is sent back over first persistent connection pipe 510. A request may not be initiated by persistent connection virtualization container 505 over first persistent connection pipe 510 because secondary storage system 512 is located behind a firewall. First persistent connection pipe 510 may be a bidirectional connection pipe, but is configured to be a unidirectional connection pipe because it is easier to manage QoS for a unidirectional connection pipe. For example, a particular characterization associated with a connection pipe, such as upload bandwidth or download bandwidth, may be desired. It is difficult to issue a QoS on a bidirectional connection pipe when traffic is initiated from both directions. It may be difficult to allocate resources for a particular characterization because there is less control on a bidirectional pipe since traffic is initiated from both directions. A unidirectional connection pipe may allow a particular amount of resources to be allocated for the particular characterization. For example, an amount of resources may be allocated for a first direction a second direction based on an importance associated with a direction. Secondary storage system 512 is comprised of a master storage node 513 and a plurality of secondary storage nodes 514, 515. The master storage node is configured to send, on behalf of secondary storage system, one or more requests to persistent connection virtualization container 505 via first persistent connection pipe 510 and to receive from persistent connection virtualization container 505 via first persistent connection pipe 510 one or more responses.

Secondary storage system 512 may send a plurality of requests to persistent connection virtualization container 505 over first persistent connection pipe 510. Conventionally, persistent connection virtualization container 505 may be configured to handle the requests serially (e.g., first in first out). However, this may cause a bottleneck to form when a lot of requests are sent to persistent connection virtualization container 505. First persistent connection pipe 510 may be configured to use a protocol that enables the plurality of requests to be multiplexed. For example, first persistent connection pipe 510 may be a HTTP/2 connection that is running the Google Remote Procedure Call (gRPC).

Persistent connection virtualization container 505 may be configured to receive one or more requests from master node 513 of secondary storage system 512 via first persistent connection pipe 510 and to forward the one or more requests to one or more containers (not shown) or one or more servers (not shown) located within cloud service system 108. Persistent connection virtualization container 505 may also be configured to receive one or more responses from the one or more containers or one or more servers, and to forward the one or more responses to master node 513 of secondary storage system 512 via first persistent connection pipe 510.

Second persistent connection pipe 520a may be established from secondary storage system 512 to persistent connection virtualization container 505. Second persistent connection pipe 520a is also a unidirectional connection, that is, a request may be initiated by secondary storage system 512 and sent to persistent connection virtualization container 505. The response from persistent connection virtualization container 505 is sent back over second persistent connection pipe 520a. A request may not be initiated by persistent connection virtualization container 505 over second persistent connection pipe 520a because secondary storage system 512 is located behind a firewall. Second persistent connection pipe 520a may be a transmission control protocol (TCP) connection. The TCP connection may be described by a file descriptor. The file descriptor includes a client side descriptor and a server side descriptor. The client side descriptor includes a source IP address and a source port. A server side descriptor includes a destination IP address and a destination port. In the example shown, master node 513 of secondary storage system 512 serves in the client role and persistent connection virtualization container 505 of access service 504 serves in the server role.

Master node 513 may request to establish second persistent connection pipe 520a with persistent connection virtualization container 505. In response to the request, persistent connection virtualization container 505 may provide a certificate associated with cloud service system 108. The certificate may include a public key associated with cloud service system 108 and a signature signed by a trusted third part. The signature may be encrypted using a private key associated with the trusted third party. The public key associated with cloud service system 108 may be used by master node 513 to encrypt data sent to persistent connection virtualization container 505. Master node 513 may verify the certificate by decrypting the encrypted signature using a public key of the trusted third party. For example, a browser associated with master node 513 may include a list of trusted authentication third party and their corresponding public keys.

Persistent connection virtualization container 505 may request master node 513 to provide a certificate. Secondary storage systems typically do not have their own certificate because it costs time and money for a trusted third party to generate the certificate for the secondary storage system. However, secondary storage system 512 may store a certificate that was provided during the cluster claim process. That certificate may be signed by cloud service system 108 and encrypted using a private key associated with cloud service system 108. Master node 513 may provide to persistent connection virtualization container 505 the certificate that was provided during the cluster claim process. In response to receiving the certificate, persistent connection virtualization container 505 may verify the certificate and verify that master node 513 is part of a registered secondary storage system.

After master node 513 and persistent connection virtualization container 505 verify the corresponding certificates, second persistent connection pipe 520a may be established between master node 513 and persistent connection virtualization container 505.

Figure 5B:
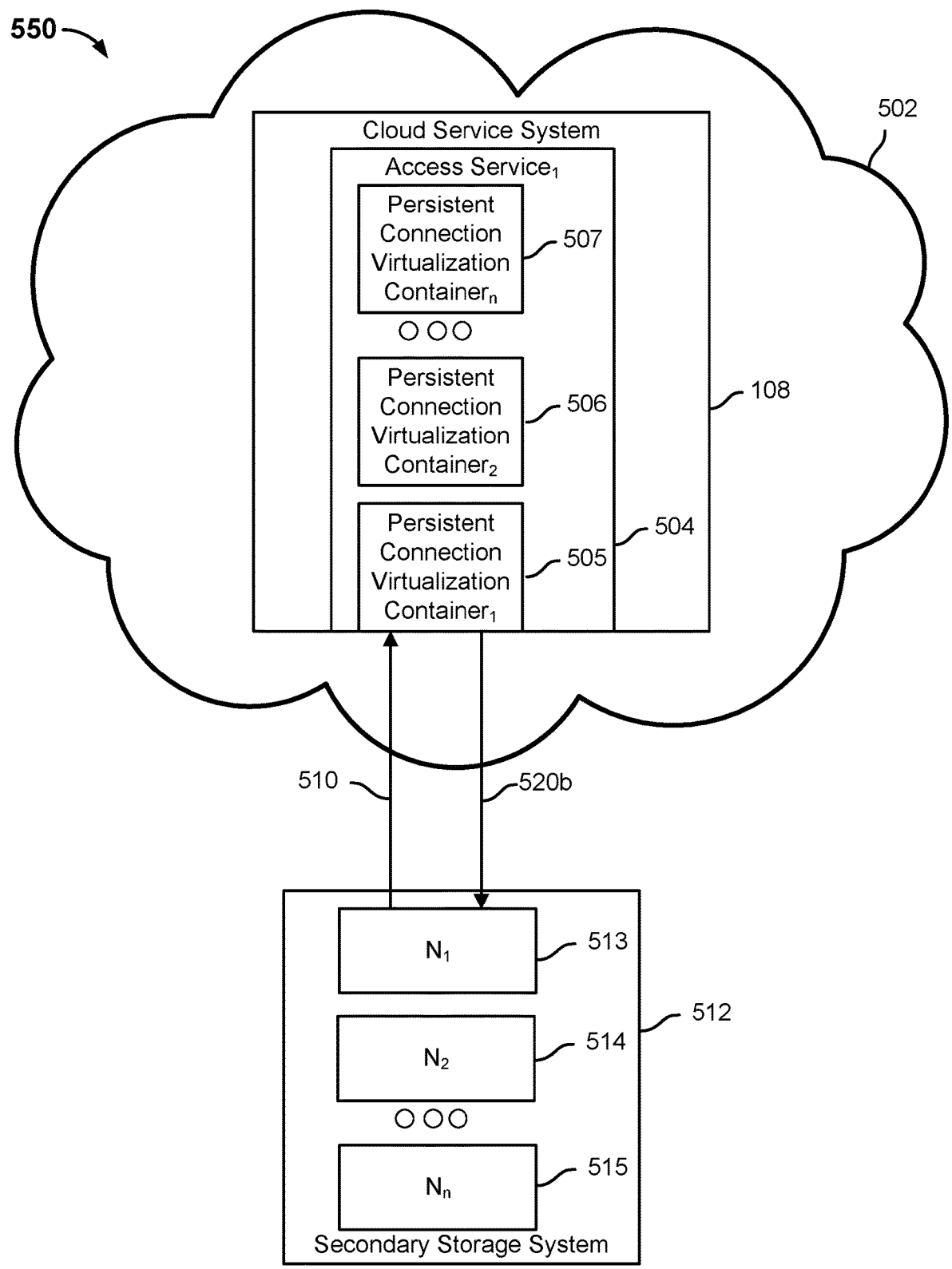
FIG. 5B is a diagram illustrating a system for bidirectional communications in accordance with some embodiments.

FIG. 5B is a diagram illustrating a system for bidirectional communications in accordance with some embodiments. In the example shown, system 550 includes system 500 includes cloud service system 108 hosted in cloud 502 and a secondary storage system 512. A direction of second persistent connection pipe 520a has been reversed in the direction of second persistent connection pipe 520b. A direction of the TCP connection may be reversed by changing the communication direction roles. For example, the client role may be changed to the server role and the server role may be changed to the client role.

In the example shown, the role of master node 513 of secondary storage system 512 for the TCP connection has been switched from a client role to a server role and the role of persistent connection virtualization container 505 of access service 504 for the TCP connection has been switched from a server role to a client role. Secondary storage system 512 may include a cloud agent (not shown) that is configured to manage the role reversal. In some embodiments, the cloud agent is running on the master node 513. In other embodiments, the cloud agent is running on each of the storage nodes of secondary storage system 512. In other embodiments, the cloud agent is running on a computing device that is part of secondary storage system 512, but separate from the storage nodes 513, 514, 515. Access service 504 may also include an agent that is configured to manage the role reversal of persistent connection virtualization container 505.

As a result, a unidirectional connection is established from persistent connection virtualization container 505 to secondary storage system 512, that is, the persistent connection virtualization container 502 may initiate and send a request to secondary storage system 512 without a firewall associated with secondary storage system 512 blocking the request, and secondary storage system 512 may respond to the request. The response may be sent back over second persistent connection pipe 520b.

Persistent connection virtualization container 505 may send one or more requests to secondary storage system 512. For example, persistent connection virtualization container 505 may send a request for secondary storage system 512 to perform a backup snapshot of a primary system to which secondary storage system 512 is associated and a request for data deduplication statistics. Instead of handling the requests serially, the second persistent connection pipe may use a protocol that enables the plurality of requests to be multiplexed. For example, the second persistent connection pipe may be a TCP connection that is running the Google Remote Procedure Call (gRPC).

In some embodiments, in the event first persistent connection pipe 510 is terminated, second persistent connection pipe 520b is also terminated. This may provide an additional layer of security for secondary storage system 512. Second persistent connection pipe 520b may enable persistent connection virtualization container 505 to send one or more requests to secondary storage system 512 even though secondary storage system 512 is located behind a firewall. Terminating second persistent connection pipe 520b in the event first persistent connection pipe 510 is terminated may prevent a user associated cloud service system 108 from sending one or more unauthorized requests to secondary storage system 512 via persistent connection virtualization container 505.

Figure 6:
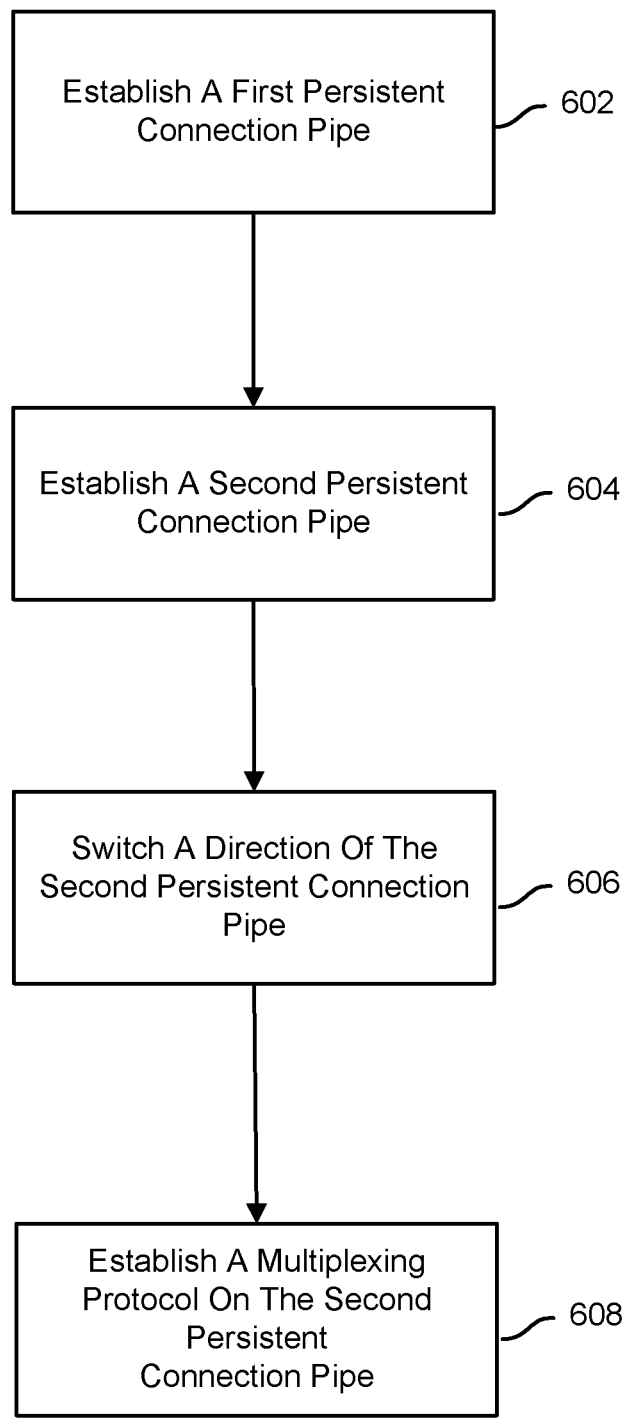
FIG. 6 is a flow chart illustrating a process for establishing bidirectional communications in accordance with some embodiments.

FIG. 6 is a flow chart illustrating a process for establishing bidirectional communications in accordance with some embodiments. In the example shown, process 600 may be implemented by a secondary storage system, such as secondary storage system 512.

At 602, a first persistent connection pipe is established. The first persistent connection pipe may be established from a master storage node of a secondary storage system to a persistent connection virtualization container associated with an access service located in a cloud (e.g., Amazon Web Services, Microsoft Azure, Google Cloud, etc.). The secondary storage system is located behind a firewall. The secondary storage system may initiate communications with the persistent connection virtualization container, but the persistent connection virtualization container cannot initiate communications with the secondary storage system. For example, the secondary storage system may send a request to the persistent connection virtualization container and the persistent connection virtualization container can send a reply in response to the request, but the persistent connection virtualization container cannot send a request to the secondary storage system and the secondary storage system won't send a reply to the request because of the firewall. The first persistent connection pipe may be a bidirectional connection pipe, but is configured to be a unidirectional connection pipe because it is easier to manage QoS associated with a unidirectional connection pipe. A connection pipe is unidirectional because a request may only be initiated from a specific source. With a bidirectional connection pipe, either endpoint of the connection pipe may initiate a request.

A secondary storage system may send a plurality of requests to a persistent connection virtualization container over the first persistent connection pipe. Conventionally, the persistent connection virtualization container may be configured to handle the requests serially (e.g., first in first out). However, this may cause a bottleneck to form when a lot of requests are sent to persistent connection virtualization container. The first persistent connection pipe may be configured to use a protocol that enables the plurality of requests to be multiplexed. For example, the first persistent connection pipe may be a HTTP/2 connection that is running the Google Remote Procedure Call (gRPC).

A master node of the secondary storage system may request to establish a first persistent connection pipe with a persistent connection virtualization container. In response to the request, the persistent connection virtualization container may provide a certificate associated with a cloud service system associated with the persistent connection virtualization container. The certificate may include a public key associated with the cloud service system and a signature that has been encrypted using a private key of a trusted party (e.g., Veritas). The public key associated with the cloud service system may be used by the master node to encrypt data sent to persistent connection virtualization container. The master node may verify the certificate by decrypting the encrypted signature using a public key of the trusted third party. For example, a browser associated with the master node may include a list of trusted authentication third party and their corresponding public keys.

The persistent connection virtualization container may request the master node to provide a certificate. Secondary storage systems typically do not have their own certificate because it costs time and money for a trusted authentication third party to generate the certificate. However, a secondary storage system may store a certificate that was provided during the cluster claim process. That certificate may be signed by the cloud service system associated with the persistent connection virtualization container. The master node may provide to the persistent connection virtualization container the certificate that was provided during the cluster claim process. The persistent connection virtualization container may verify the certificate and verify that the master node is part of a registered secondary storage system.

After the master node and the persistent connection virtualization container verify the corresponding certificates, a first persistent connection pipe may be established between the master node and the persistent connection virtualization container. Data that is transmitted via the first persistent communication pipe may be encrypted using the public key associated with the cloud service system. The persistent connection virtualization container may decrypt data using the private key associated with the cloud service system.

At 604, a second persistent connection pipe is established. The second persistent connection pipe may be a TCP connection. The second persistent connection pipe may be established from a secondary storage system to a persistent connection virtualization container associated with a cloud service system. The second persistent connection pipe is also a unidirectional connection, that is, a request may be initiated by a secondary storage system and sent to a persistent connection virtualization container and the response from persistent connection virtualization container is sent back over the second persistent connection pipe. However, a request may not be initiated by a persistent connection virtualization container over the second persistent connection pipe because the secondary storage system is located behind a firewall.

A TCP connection may be described by the file descriptor. The TCP connection may be described by a client side descriptor and a server side descriptor. The client side descriptor includes a source IP address and a source port. A server side descriptor includes a destination IP address and a destination port. A master node of a secondary storage system may serve in the client role and a persistent connection virtualization container associated with a cloud service system may serve in the server role. The TCP connection may be described using a client side descriptor and a server side descriptor. The client side descriptor includes a source IP address and a source port. The server side descriptor includes a destination IP address and a destination port.

A master node of the secondary storage system may request to establish a second persistent connection pipe with a persistent connection virtualization container. In response to the request, the persistent connection virtualization container may provide a certificate associated with a cloud service system. The certificate may include a public key associated with the cloud service system and a signature signed by a trusted third party (e.g., Veritas). The signature may be encrypted using a private key associated with the trusted third party. The public key associated with the cloud service system may be used by the master node to encrypt data sent to persistent connection virtualization container. The master node may verify the certificate by decrypting the encrypted signature using a public key of the trusted authentication third party. For example, a browser associated with the master node may include a list of trusted authentication third party and their corresponding public keys.

The persistent connection virtualization container may request the master node to provide a certificate. The secondary storage system may store a certificate that was provided during the cluster claim process. That certificate may be signed by the cloud service system associated with the persistent connection virtualization container. The master node may provide to the persistent connection virtualization container the certificate that was provided during the cluster claim process. The persistent connection virtualization container may verify the certificate and verify that master node 513 is part of a registered secondary storage system.

After the master node and the persistent connection virtualization container verify the corresponding certificates, a second persistent connection pipe may be established between the master node and the persistent connection virtualization container. Data that is transmitted via the second persistent communication pipe may be encrypted using the public key associated with the cloud service system. The persistent connection virtualization container may decrypt data using the private key associated with the cloud service system.

At 606, a direction of the second persistent connection pipe is reversed. A direction of the second persistent connection pipe may be reversed by changing the communication direction roles. For example, the client role may change to be the server role and the server role may change to be the client role. The role of a master node of a secondary storage system for the second persistent connection pipe may be switched from a client role to a server role and the role of a persistent connection virtualization container associated with a cloud service system for the second persistent connection pipe may be switched from a server role to a client role. The secondary storage system may include a cloud agent that is configured to manage the role reversal. In some embodiments, the cloud agent is running on the master node of the secondary storage system. In other embodiments, the cloud agent is running on each of the storage nodes of secondary storage system. In other embodiments, the cloud agent is running on a computing device that is part of the secondary storage system, but separate from the storage nodes. The access service may also include an agent that is configured to manage the role reversal of its persistent connection virtualization container.

As a result, a unidirectional connection is established from a persistent connection virtualization container associated with a cloud service system to a secondary storage system, that is, the persistent connection virtualization container may initiate and send a request to a secondary storage system without a firewall associated with the secondary storage system blocking the request, and the secondary storage system may respond to the request. The response may be sent back over second persistent connection pipe.

At 608, a multiplexing protocol is established on the second persistent connection pipe. The persistent connection virtualization container may send one or more requests to the secondary storage system. For example, the persistent connection virtualization container may send a request for the secondary storage system to perform a backup snapshot of a primary system to which the secondary storage system is associated and a request for data deduplication statistics. Instead of handling the requests serially, the second persistent connection pipe may use a protocol that enables the plurality of requests to be multiplexed. For example, the second persistent connection pipe may be a TCP connection that is running the Google Remote Procedure Call (gRPC).

Bidirectional communications are established between a secondary storage system and a cloud service system by establishing a first persistent connection pipe, establishing a second persistent connection pipe, and switching a direction of the second persistent connection pipe. Using two unidirectional persistent connection pipes allows QoS metrics to be established and easily maintained for each of the persistent connection pipes when compared to using a single bidirectional communication pipe. Using a multiplexing protocol for both persistent connection pipes also allows the requests to be handled in a more timely fashion.

In some embodiments, bidirectional communications may be interrupted. For example, the master node of the secondary storage system may go offline and one of the secondary nodes of the secondary storage system becomes the master node. The new master node needs to re-establish bidirectional communications with the persistent connection virtualization container.

Containers are ephemeral in nature. As a result, the persistent connection virtualization container may be torn down and revived as a new instance of the persistent connection virtualization container. The new instance may be on the same access service or a different access service. Regardless of where the new instance of the persistent connection virtualization container is located, the bidirectional communications between the secondary storage system and the persistent connection virtualization container need to be re-established. Bidirectional communications may be re-established by repeating process 600.

Figure 7A:
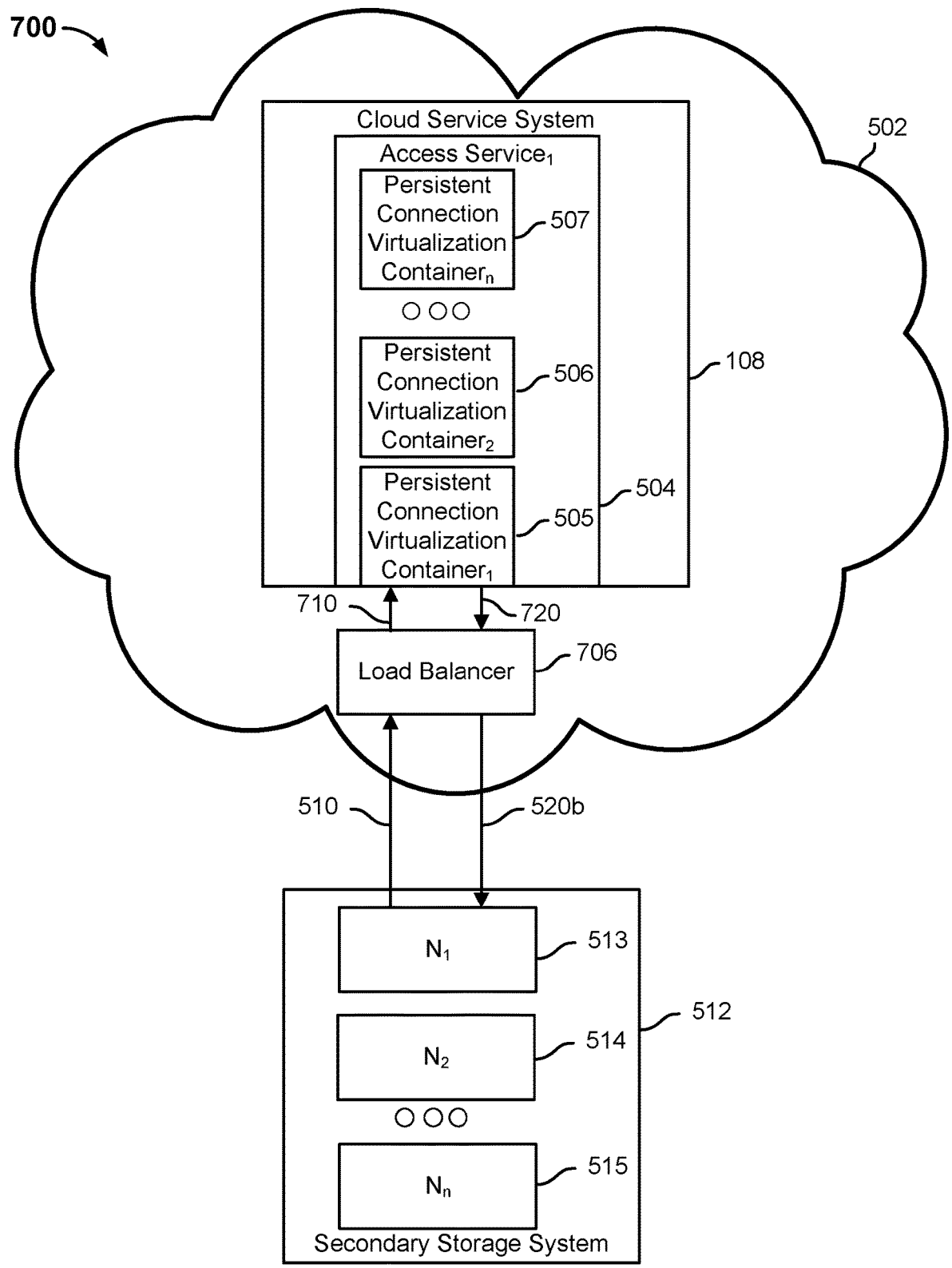
FIG. 7A is a diagram illustrating a system for bidirectional communications in accordance with some embodiments.

FIG. 7A is a diagram illustrating a system for bidirectional communications in accordance with some embodiments. In the example shown, system 700 includes cloud service system 108 hosted in cloud 502 and a secondary storage system 512.

Typically, a connection is described by the source IP address, source port, destination IP address, and destination port. Two connections have been established between the master storage node 513 of secondary storage system 512 and the persistent connection virtualization container 505 running on access service 504. For a request on first persistent connection pipe 510 or a reply on second persistent connection pipe 520*b*, the source IP address, source port, destination port (typically port 443), and destination port are the same for both connections. This is usually not permitted. Conventional systems will refuse to establish either first persistent connection pipe 510 or second persistent connection pipe 520*b*.

One solution is to open a second port on the master storage node 513 of secondary storage system 512. However, this requires some additional configuration of secondary storage system 512. Another solution is to open a second port for the persistent connection virtualization container 505 running on access service 504. However, this also requires some additional configuration of secondary storage system 512. For example, secondary storage system 512 needs to be configured such that first persistent connection pipe 510 is configured to communicate with a first port of access service 504 and second persistent connection pipe 520*b* is configured to communicate with a second port of access service 504. Both solutions may not be desirable because they require additional programming of the secondary storage system. Not requiring additional programming of the secondary storage system when installing the secondary storage system at a datacenter makes the installation of the secondary storage system more seamless.

Load balancer 706 may be implemented in cloud 502 to solve the duplicate connection descriptor problem. In some embodiments, load balancer 706 is located in cloud 502 separate from access service 504. In other embodiments, load balancer 706 is part of access service 504. Data may be received at persistent connection virtualization container 505 via first persistent connection pipe 510 or second persistent connection pipe 520*b*. It is difficult to determine whether the data is a request sent from master node 513 or a reply sent from master node 513. Load balancer 706 may be a TCP load balancer.

Load balancer 706 may be configured to receive one or more data packets sent from secondary storage system 512 to persistent connection virtualization container 505. Load balancer 706 may forward the data packets to the appropriate access service of cloud service system 108 based on information included in the received data. For example, the information included in the received data may include an IP address associated with an access service, a name associated with an access service, etc. Load balancer 706 may be configured to inspect a header associated with the data packets. In the event the data packets include a header associated with a HTTP/2 connection, load balancer 706 may determine that the data packets are associated with first persistent connection pipe 510 and forward the data packets to a destination associated with first persistent connection pipe 510. For example, the destination associated with first persistent connection pipe 510 may be a gRPC server (not shown) associated with access service 504. In the event the data packets do not include a header, load balancer 706 may determine that the data packets are associated with second persistent connection pipe 520*b* and forward the data packets to a destination associated with second persistent connection pipe 520*b*. For example, the destination associated with second persistent connection pipe 520*b* may be a TCP server (not shown) associated with access service 504. This may solve the duplicate connection descriptor problem without having to explicitly configure the secondary storage system such that first persistent connection pipe 510 sends data to a first port of persistent connection virtualization container 505 and second persistent connection pipe 520*b* sends data to a second port of persistent connection virtualization container 505.

Figure 7B:
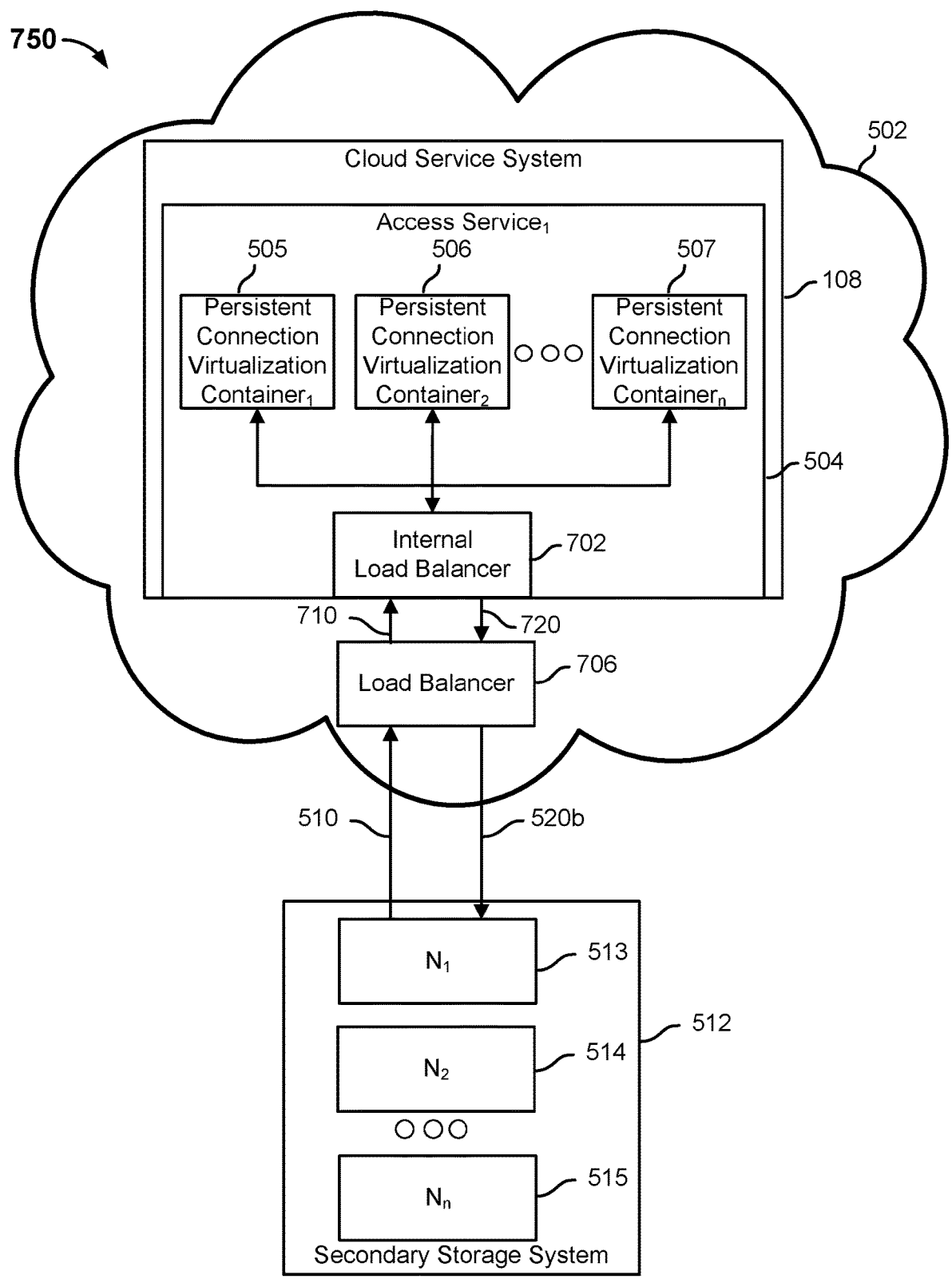
FIG. 7B is a diagram illustrating a system for bidirectional communications in accordance with some embodiments.

FIG. 7B is a diagram illustrating a system for bidirectional communications in accordance with some embodiments. In the example shown, system 750 includes cloud service system 108 hosted in cloud 502 and a secondary storage system 512. System 750 is similar to system 700, but access service 504 includes internal load balancer 702. In other embodiments, cloud service system 108 includes a plurality of access services. Each access service may have a corresponding internal load balancer. Internal load balancer 702 may forward data received at access service 504 to one of the persistent connection virtualization containers 505, 506, 507. Internal load balancer 702 may forward the data to the appropriate persistent connection virtualization container based on information included in the received data. For example, the information included in the received data may include an IP address associated with a persistent connection virtualization container, a name associated with a persistent connection virtualization container, etc.

Load balancer 706 may be configured to receive one or more data packets sent from secondary storage system 512 to persistent connection virtualization container 505 and to forward the one or more data packets to internal load balancer 702 of access service 504. Internal load balancer 702 may be load balancing service that is associated with an access service. For example, internal load balancer 702 may be a Kubernetes service. Internal load balancer 702 may act as a multiplexer and forward the received data packets to the correct destination. Internal load balancer 702 may be configured to receive the one or more data packets (e.g., either from persistent connection virtualization containers or secondary storage systems) and to inspect a header associated with the data packets. In the event the data packets include a header associated with a HTTP/2 connection, internal load balancer 702 may determine that the data packets are associated with first persistent connection pipe 510 and forward the data packets to a destination associated with first persistent connection pipe 510. For example, the destination associated with first persistent connection pipe 510 may be a gRPC server (not shown) associated with access service 504. In the event the data packets do not include a header, internal load balancer 702 may determine that the data packets are associated with second persistent connection pipe 520*b* and forward the data packets to a destination associated with second persistent connection pipe 520*b*. For example, the destination associated with second persistent connection pipe 520*b* may be a TCP server (not shown) associated with access service 504. This may solves the duplicate connection descriptor problem without having to explicitly configure the secondary storage system such that first persistent connection pipe 510 sends data to a first port of persistent connection virtualization container 505 and second persistent connection pipe 520*b* sends data to a second port of persistent connection virtualization container 505.

Figure 8:
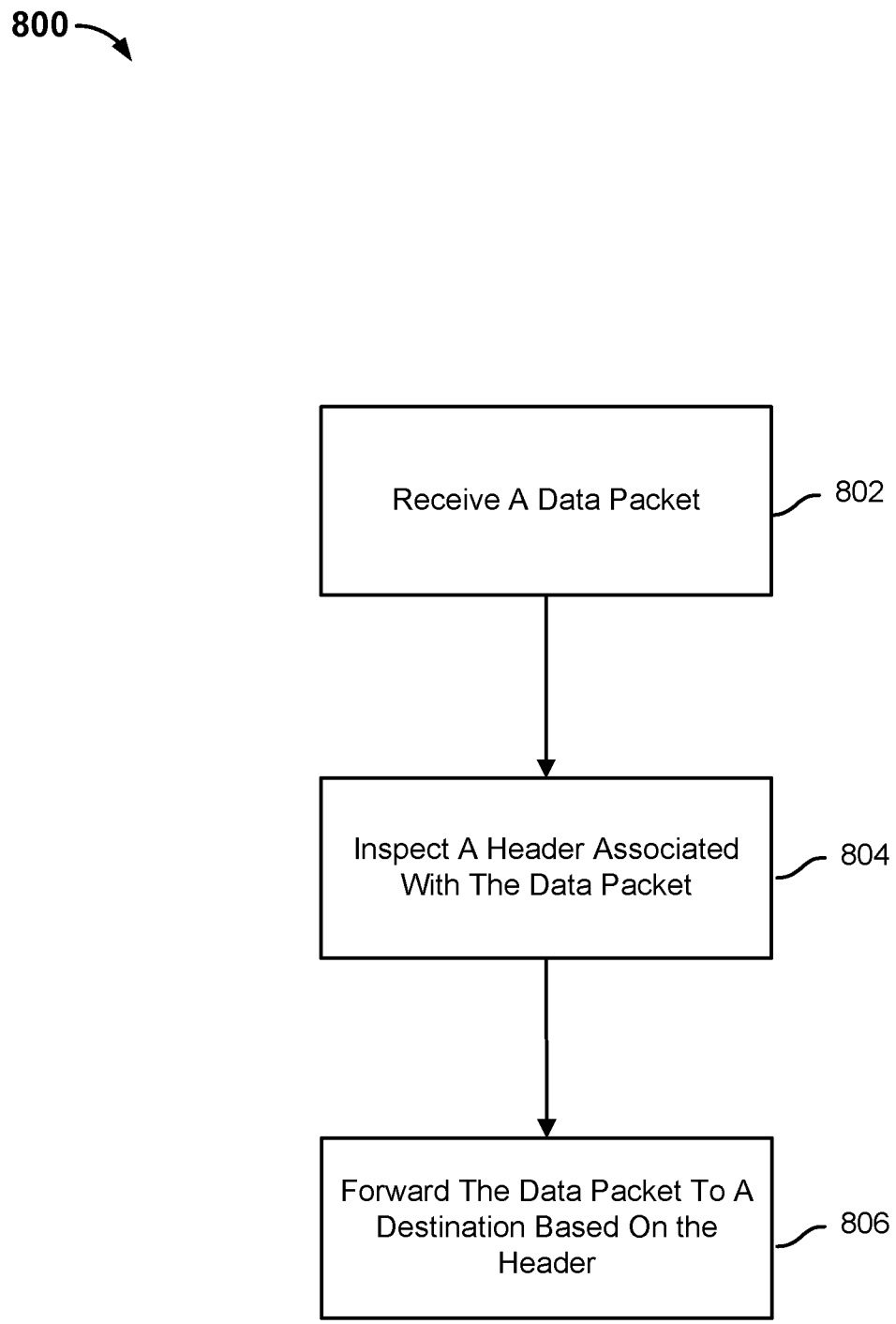
FIG. 8 is a flow chart illustrating a process for sending data to a cloud service system.

FIG. 8 is a flow chart illustrating a process for sending data to a cloud service system. In the example shown, process 800 may be implemented by a load balancer, such as load balancer 706 or internal load balancer 702.

At 802, data is received. When data is sent from the secondary storage system to the persistent connection virtualization container over the network, the data may include a header and a payload. The header identifies the source and destination of the packet, while the actual data sent is included in the payload. A load balancer may be configured to intercept the data while the data is in route to the persistent connection virtualization container.

At 804, a header associated with the data packet is inspected. The load balancer may be configured to examine the header associated with incoming data packets (e.g., sniff the first couple of bits) to determine which connection the incoming data packets are associated. The header associated with data sent from a connection based on HTTP/2 will have different information that data sent from a TCP connection.

At 806, the data packet is forwarded to a destination based on the header. In the event the incoming data packets include a header associated with HTTP/2, the load balancer is configured to forward the data packets to a destination associated with a first persistent connection pipe. For example, the destination associated with the first persistent connection pipe may be a gRPC server associated with an access service. In the event the incoming data packets do not include a header, i.e., the incoming data packets are associated with the TCP connection, the load balancer is configured to forward the data packets to a destination associated with a second persistent connection pipe. For example, the destination associated with the second persistent connection pipe may be a TCP server associated with an access service.

Figure 9A:
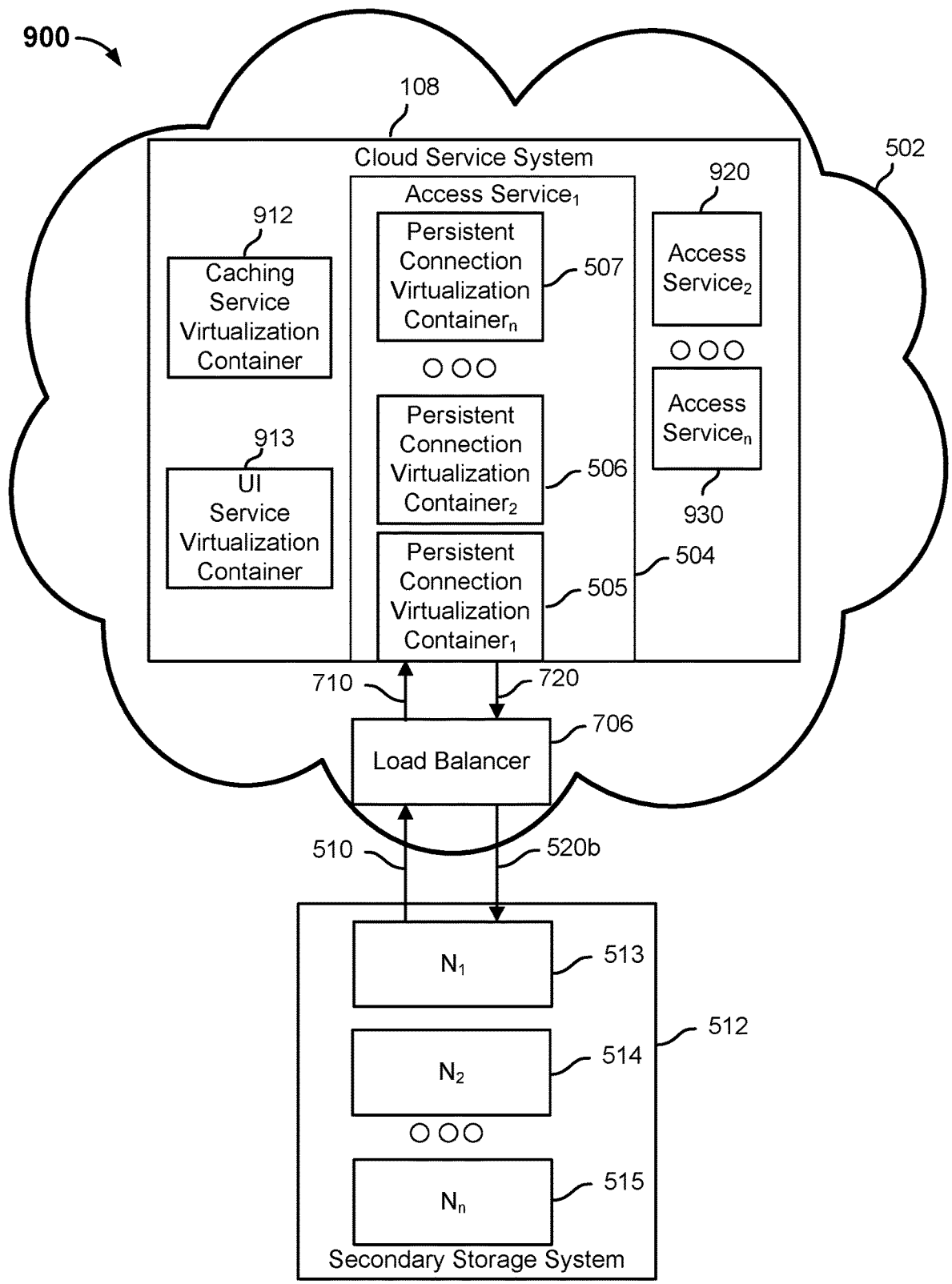
FIG. 9A is a block diagram illustrating a system for providing a cloud-based service in accordance with some embodiments.

FIG. 9A is a block diagram illustrating a system for providing a cloud-based service in accordance with some embodiments. In the example shown, system 900 includes cloud 502 and secondary storage system 512. Cloud 502 comprises cloud service system 108 and load balancer 706. Cloud service system 108 is coupled to secondary storage system 512 via load balancer 706. Bidirectional communications have been established between secondary storage system 512 and persistent connection virtualization container 505 via first persistent connection pipe 510 and second persistent connection pipe 520*b*. Either secondary storage system 512 or persistent connection virtualization container 505 may initiate communications after bidirectional communications are established.

Cloud service system 108 may enable users associated with a plurality of enterprises to access their corresponding secondary storage systems. Cloud service system 108 may provide a UI service virtualization container 913 that enables a user device (e.g., computer, laptop, desktop, smartphone, smartwatch, etc.) to access a secondary storage system via cloud service system 108. Cloud service system 108 includes a plurality of access services. For example, cloud service system 108 includes a first access service 504, a second access service 920, and an nth access service 930. An access service may be hosted on one or more servers hosted in cloud 502. An access service may include one or more persistent connection virtualization containers. For example, access service 504 includes a first persistent connection virtualization container 505, a second persistent connection virtualization container 506, and an nth persistent connection virtualization container 507. Although n access services are depicted, cloud service system 108 may include one or more access services.

Bidirectional communications may be established between a persistent connection virtualization container and a secondary storage system. For example, bidirectional communications may be established between persistent connection virtualization containers 902, 904, 505 and a corresponding secondary storage system. More specifically, bidirectional communications may be established between persistent connection virtualization container 902 and a first secondary storage system, bidirectional communications may be established between persistent connection virtualization container 904 and a second secondary storage system, and bidirectional communications may be established between persistent connection virtualization container 505 and an nth secondary storage system. In the example shown, bidirectional communications has been established between persistent connection virtualization container 505 and secondary storage system 512.

Each persistent connection virtualization container has a corresponding IP address. Containers are ephemeral in nature. A container is assigned an IP address when it is instantiated on an access service. A container may go offline for one or more various reasons and be reborn after a period of time and be associated with the same or different access service. The container's IP address may be reassigned to a different container after the container goes offline. The container may be assigned a different IP address when it is reborn. Load balancer 706 may receive data from secondary storage system 512. Load balancer 706 may forward data to any of the persistent connection virtualization containers, but is configured to forward the data based on a destination IP address associated with the data. In the example shown, load balancer 706 may forward data to any of the persistent connection virtualization containers 505, 506, 507, but load balancer 706 is configured to forward data received from secondary storage system 512 to persistent connection virtualization container 505.

Cloud service system 108 may include caching service virtualization container 512. Due to the ephemeral nature of containers, it is difficult to keep track of a location associated with a container. For example, a persistent connection virtualization container may be assigned a first IP address and associated with a first access service at a first point in time. The persistent connection virtualization container may be reassigned a second IP address and associated with a second access service at a second point in time. Regardless of where the persistent connection virtualization container is located, the persistent connection virtualization container is associated with a particular secondary storage system. Caching service virtualization container 512 is configured to store a data structure. The data structure is configured to record and preserve a state associated with bidirectional communications. For example, the state may include an IP address associated with a persistent connection virtualization container, a data center to which the persistent connection virtualization container is associated, a specified secondary storage system identifier associated with a secondary storage system (e.g., a clusterID associated with a secondary storage system), etc. Caching service virtualization container 512 may be configured to store the state of the bidirectional communications between persistent connection virtualization container 505 and secondary storage system 512. The state may include an IP address associated with persistent connection virtualization container 505 and a specified secondary storage system identifier (e.g., clusterID) associated with secondary storage system 512. The persistent connection virtualization container may become aware of the specified secondary storage system identifier associated with a secondary storage system during a cluster claim procedure. A persistent connection virtualization container may be configured to update caching service virtualization container 512 after bidirectional communications is established with a secondary storage system. For example, persistent connection virtualization container 505 may be configured to provide state information to caching service virtualization container 912 after first persistent connection pipe 510 and second persistent connection pipe 520b are established. In some embodiments, a persistent connection virtualization container is configured to periodically provide (e.g., every two minutes) caching service virtualization container 912 a heartbeat signal. The heartbeat signal may include connection state information. In the event caching service virtualization container 912 does not receive the heartbeat signal within a threshold period of time, caching service virtualization container may determine that the persistent connection virtualization container is offline. In other embodiments, a secondary storage system is assigned a different persistent virtualization container after re-establishing bidirectional communications. An available persistent connection virtualization container of the n persistent connection virtualization containers may be selected and assigned to a secondary storage system. The selected persistent connection virtualization container may be configured to provide to caching service virtualization container 912 state information associated with the bidirectional communications between the selected persistent connection virtualization container and the secondary storage system. In some embodiments, the selected persistent connection virtualization container is selected from a set of available persistent connection virtualization containers via a round robin selection process.

Cloud service system 108 may include UI service virtualization container 913. A user may login to UI service virtualization container 913 via a user device (not shown) and a network connection (not shown). UI service virtualization container 913 may provide a user interface to the user device. The user may have registered one or more secondary storage systems with cloud service system 108 via the cluster claim procedure. The user interface may be a unified management interface for all of the secondary storage systems to which the user is associated. This enables to the user to remotely access and manage secondary storage systems that are physically located separately throughout the world from a single location. The user may initiate one or more commands to at least one of the secondary storage systems via the user interface provided by UI service virtualization container 913. UI service virtualization container 913 is configured to forward the one or more commands to the secondary storage system via the persistent connection virtualization container associated with the secondary storage system. UI service virtualization container 913 does not know which persistent connection virtualization container of the plurality of persistent connection virtualization containers is to receive the one or more commands.

The one or more commands may include information associated with a destination for the one or more commands. For example, the information may include a specified secondary storage system identifier associated with a secondary storage system (e.g., clusterID of the secondary storage system) that is to receive the one or more commands. UI service virtualization container 913 may be configured to request from caching service virtualization container 912 an identifier associated with a persistent connection virtualization container corresponding to a specified secondary storage system identifier associated with a secondary storage system, i.e., UI service virtualization container 913 provides to caching service virtualization container 912 the information associated with a destination for the one or more commands. Caching service virtualization container 912 may respond to the request by inspecting a data structure stored by caching service virtualization container 912 to identify a persistent connection virtualization container associated with a secondary storage system that is to receive the one or more commands. For example, caching service virtualization container 912 may determine an IP address of a persistent connection virtualization container that is associated with the specified secondary storage system identifier associated with a secondary storage system. Caching service virtualization container 912 may then provide UI service virtualization container 913 the identifier (e.g., IP address) associated with the persistent connection virtualization container corresponding to the specified secondary storage system identifier.

In response to receiving the IP address of the persistent connection virtualization container that corresponds to the specified secondary storage system identifier, UI service virtualization container 913 is configured to provide the one or more commands to the appropriate persistent connection virtualization container. In response to receiving the one or more commands, the appropriate persistent connection virtualization container is configured to provide the one or more commands to the appropriate secondary storage system. In response to receiving the one or more commands, the secondary storage system is configured to perform one or more secondary storage functions based on the one or more received commands. For example, UI service virtualization container 913 may provide one or more commands to persistent connection virtualization container 505, which in turn, provides the one or more commands to master node 513 of secondary storage system 512. The one or more secondary storage functions may include a backup function, a restore function, a replication function, an update function, or any other secondary storage functions that the secondary storage system is configured to perform.

Figure 9B:
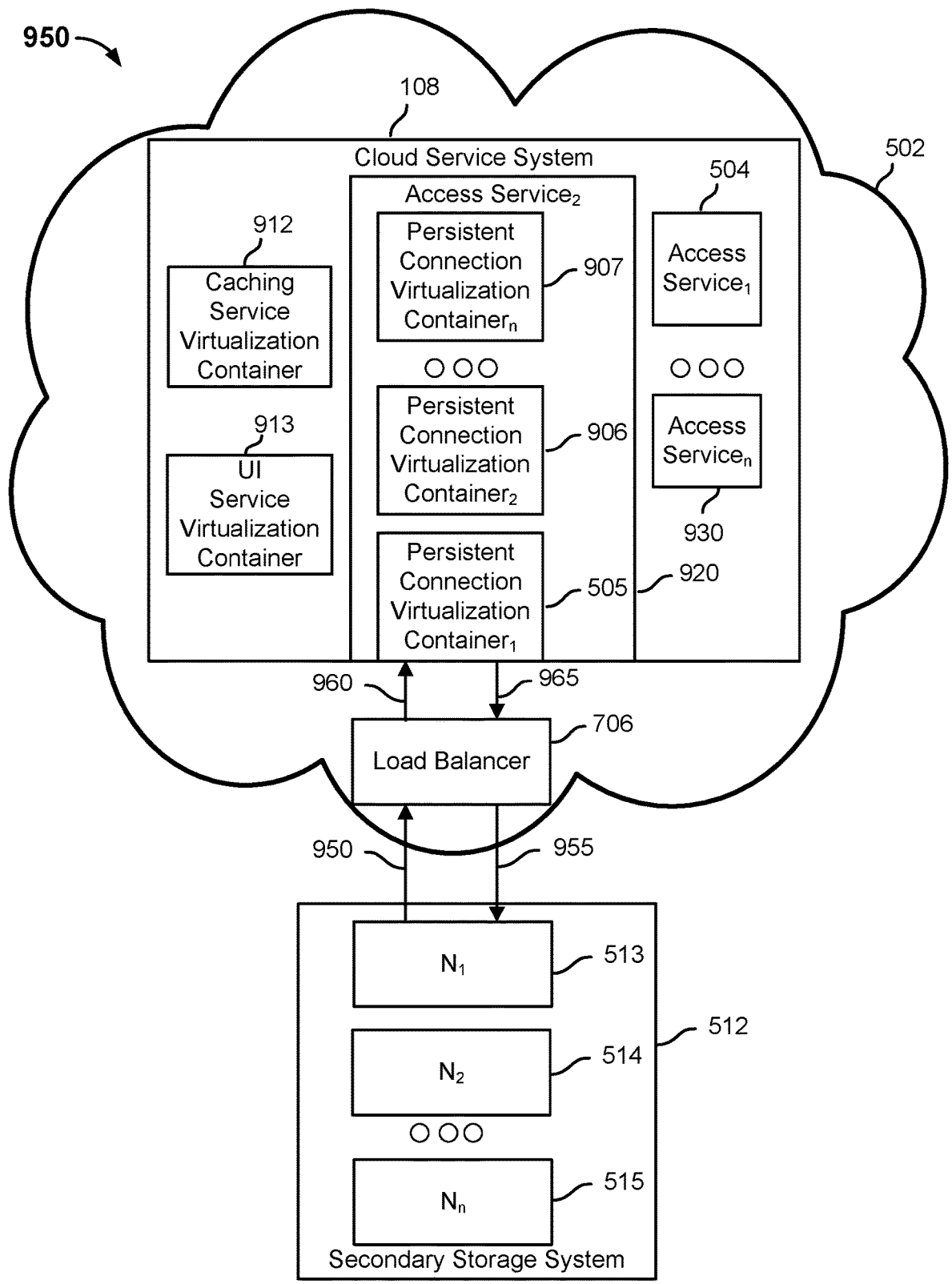
FIG. 9B is a block diagram illustrating a system for providing a cloud-based service in accordance with some embodiments.

FIG. 9B is a block diagram illustrating a system for providing a cloud-based service in accordance with some embodiments. Due to the ephemeral nature of containers, a persistent connection virtualization container may go offline and be reborn on the same or different access service. In the example shown, persistent connection virtualization container 505 went offline for a period of time and was reborn on access service 920. An access service may include one or more persistent connection virtualization containers. For example, access service 920 includes a first persistent connection virtualization container 505, a second persistent connection virtualization container 906, and an nth persistent connection virtualization container 907.

In some embodiments, bidirectional communications between persistent connection virtualization container 505 and master node 513 of secondary storage system 512 terminate when persistent connection virtualization container 505 goes offline. In other embodiments, bidirectional communications between persistent connection virtualization container 505 and master node 513 of secondary storage system terminate when secondary storage system 512 goes offline. Bidirectional communications between persistent connection virtualization container 505 and master node 513 of secondary storage system 512 needs to be re-established. A persistent connection virtualization container may be determined to be offline when a master node of a secondary storage system sends a request to a persistent connection virtualization container and load balancer 706 is unable to locate the persistent connection virtualization container associated with the request. For example, the request may include an IP address associated with a persistent connection virtualization container and none of the access services 920, 505, 930 include a persistent connection virtualization container having the IP address. A persistent connection virtualization container may be determined to be offline when UI service virtualization container 913 receives one or more commands for a secondary storage system, requests from caching service virtualization container 912 an identifier associated with a persistent connection virtualization container corresponding to a specified secondary storage system identifier associated with the secondary storage system, and caching service virtualization container 912 is unable to provide a valid identifier (e.g., the stored IP address is unassigned or assigned to a different persistent connection virtualization container). UI service virtualization container 913 may then determine that a persistent connection virtualization container associated with the one or more commands does not exist. In some embodiments, a persistent connection virtualization container is configured to periodically provide (e.g., every two minutes) caching service virtualization container 912 a heartbeat signal. The heartbeat signal may include connection state information. In the event caching service virtualization container 912 does not receive the heartbeat signal within a threshold period of time, caching service virtualization container may determine that the persistent connection virtualization container is offline.

Bidirectional communications may be re-established between persistent connection virtualization container 505 and master node 513 of secondary storage system 512 by performing a process, such as process 600. In other embodiments, bidirectional communications is re-established between an available persistent connection virtualization container and master node 513 of secondary storage system 512 by performing a process, such as process 600. The available persistent connection virtualization container may be selected from a set of available persistent connection virtualization containers. In the example shown, a first persistent connection pipe 950 and a second persistent connection pipe 955 has been established between persistent connection virtualization container 505 and master node 513 of secondary storage system 512. Load balancer 706 is configured to intercept the data sent from master node 513 of secondary storage system 513 to persistent connection virtualization container 505 and to provide the data via connection pipes 960, 965.

After bidirectional communications are re-established, persistent connection virtualization container 505 is configured to send an update to caching service virtualization container 912. The update includes information about the state of the bidirectional communications between persistent connection virtualization container 505 and secondary storage system 512. The state may include the IP address associated with the persistent connection virtualization container and a secondary storage system identifier associated with a secondary storage system 512 (e.g., clusterID). Upon receiving the update, caching service virtualization container 912 is configured to update a data structure. The data structure may be updated such that the old IP address associated with persistent connection virtualization container 505 is replaced with the current IP address associated with persistent connection virtualization container 505. Caching service virtualization container 912 may identify the entry of the data structure to update based on the secondary storage system identifier associated with a secondary storage system (e.g., clusterID). This may enable UI service virtualization container 913 to provide to the appropriate persistent connection virtualization container one or more commands received from a user via a UI associated with UI service virtualization container 913. This may also enable load balancer 706 to provide data received from a master node of a secondary storage system to the appropriate persistent connection virtualization container.

Figure 10:
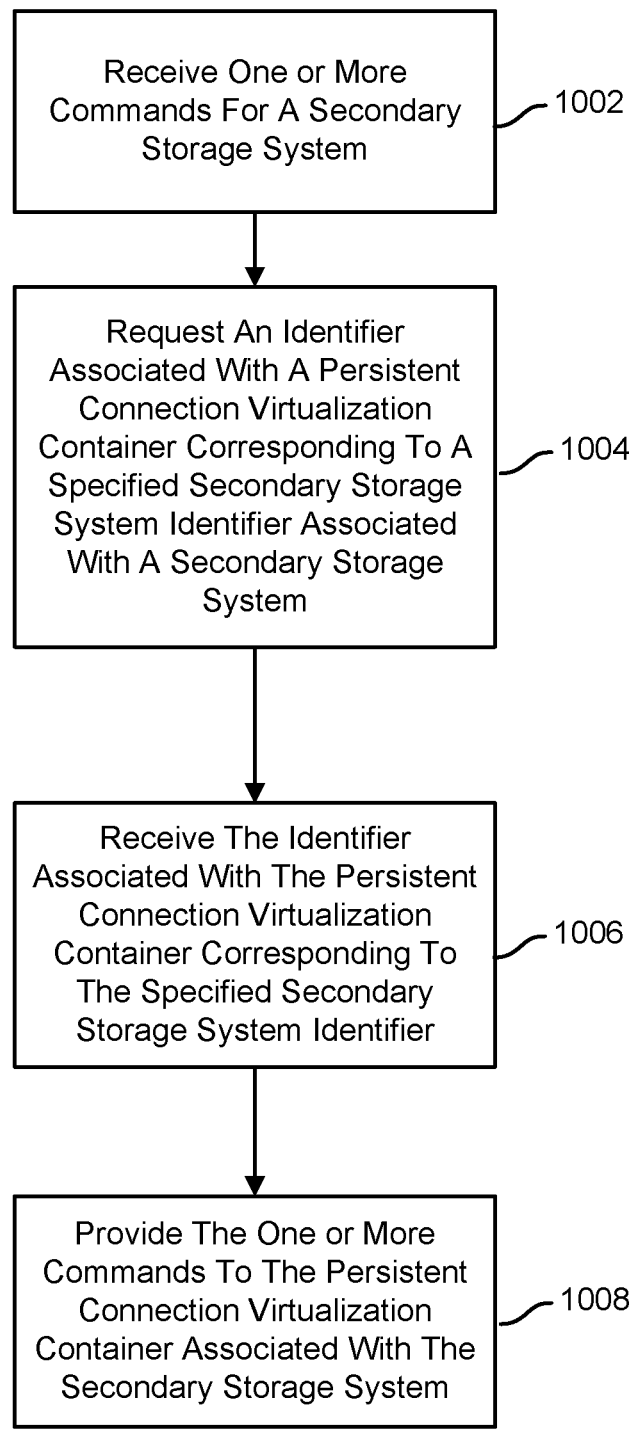
FIG. 10 is a flow chart illustrating a process for sending a request to a secondary storage system.

FIG. 10 is a flow chart illustrating a process for sending a request to a secondary storage system. In the example shown, process 1000 may be implemented by a UI service virtualization container, such as UI service virtualization container 913.

At 1002, one or more commands for a secondary storage system are received. The one or more commands may include a specified secondary storage system identifier (e.g., clusterID) associated with a secondary storage system.

A user may login to a UI service virtualization container associated with a cloud service system via a user device and a network connection. The UI service virtualization container may provide a user interface to the user device. The user may have registered one or more secondary storage systems with the cloud service system via a cluster claim procedure. The user interface may be a unified management interface for all of the secondary storage systems to which the user is associated. This enables to the user to remotely access and manage secondary storage systems that are physically located separately throughout the world from a single location. The user may initiate one or more commands to at least one of the secondary storage systems via the user interface provided by the UI service virtualization container. For example, a user associated with the secondary storage system may at any time request via the user interface associated with the cloud service system, for the secondary storage system of the datacenter to perform a backup snapshot of the file system data associated with the primary system of the datacenter.

The UI service virtualization container does not know which persistent connection virtualization container of the plurality of persistent connection virtualization containers is to receive the one or more commands because it does not store such information.

At 1004, an identifier associated with a persistent connection virtualization container corresponding to a specified secondary storage system identifier associated with a secondary storage system is requested from a caching service virtualization container. The UI service virtualization container may provide the specified secondary storage system identifier in the request. A caching service virtualization container may respond to the request by inspecting a data structure stored by the caching service virtualization container to identify a persistent connection virtualization container associated with the specified secondary storage system identifier. The caching service virtualization container may respond to the request by providing the UI service virtualization container the identifier (e.g., IP address) associated with the persistent connection virtualization container corresponding to the specified secondary storage system identifier.

At 1006, the identifier associated with the persistent connection virtualization container corresponding to the specified secondary storage system identifier is received.

At 1008, the one or more commands are provided to the persistent connection virtualization container associated with the secondary storage system. The one or more commands are provided to the persistent connection virtualization container having the identifier received from the caching service virtualization container. In response to receiving the one or more commands, the persistent connection virtualization container is configured to provide the one or more commands to the appropriate secondary storage system. In response to receiving the one or more commands, the secondary storage system is configured to perform one or more secondary storage functions (e.g., a backup, a restore, etc.) based on the one or more commands.

Figure 11:
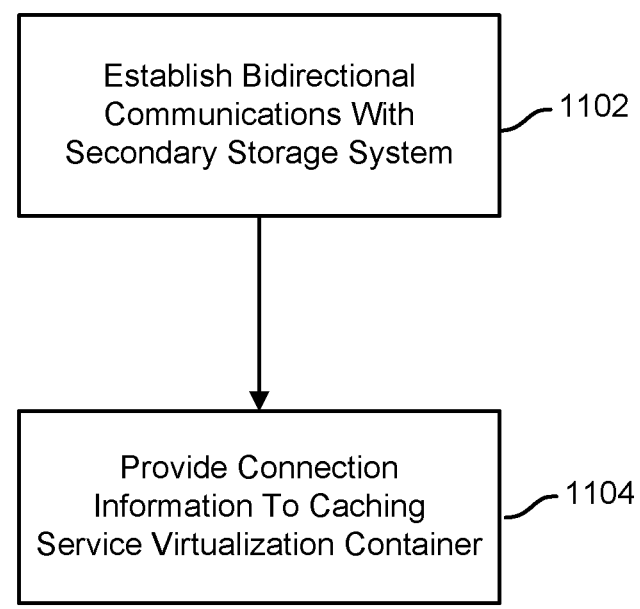
FIG. 11 is a flow chart illustrating a process for updating a caching service virtualization container.

FIG. 11 is a flow chart illustrating a process for updating a caching service virtualization container. In the example shown, process 1100 may be implemented by a persistent connection virtualization container, such as persistent connection virtualization containers 505, 902, 904, 921, 923, 924.

At 1102, bidirectional communications are established with a secondary storage system. In some embodiments, bidirectional communications are established between a secondary storage system and a persistent connection virtualization container by performing a process, such as process 600 discussed above.

In other embodiments, bidirectional communications need to be re-established between the secondary storage system and a persistent connection virtualization container. Due to the ephemeral nature of containers, a persistent connection virtualization container may go offline and be reborn on the same or different access service. Bidirectional communications between a persistent connection virtualization container and a master node of a secondary storage system terminate when a persistent connection virtualization container or the secondary storage system goes offline.

A persistent connection virtualization container may be determined to be offline when a master node of a secondary storage system sends a request to a persistent connection virtualization container and a load balancer is unable to locate the persistent connection virtualization container associated with the request. The load balancer may deny the request when it is unable to locate the persistent connection virtualization container associated with the request. A persistent connection virtualization container may be determined to be offline when UI service virtualization container receives one or more commands requests from a caching service virtualization container an identifier associated with a persistent connection virtualization container corresponding to a specified secondary storage system identifier associated with a secondary storage system, and the caching service virtualization container is unable to provide a valid identifier. The UI service virtualization container may then determine that a persistent connection virtualization container associated with the one or more commands does not exist. Bidirectional communications may be re-established between a persistent connection virtualization container and a master node of a secondary storage system by performing a process, such as process 600. In some embodiments, bidirectional communications is established with a second persistent connection virtualization container and a master node of a secondary storage system after bidirectional communications between a first persistent connection virtualization container and the master node of the secondary storage system terminates.

At 1104, connection information is provided to a caching service virtualization container. After bidirectional communications are established or re-established, a persistent connection virtualization container is configured to send an update to a caching service virtualization container. The update includes information about the state of the bidirectional communications between the persistent connection virtualization container and the secondary storage system. The state may include the IP address associated with the persistent connection virtualization container and a secondary storage system identifier (e.g., clusterID associated with secondary storage system). Upon receiving the update, the caching service virtualization container is configured to update a data structure. The data structure may be updated to include a new entry that associates the IP address associated with the persistent connection virtualization container with the clusterID associated with the secondary storage system. The data structure may be updated such that the old IP address associated with persistent connection virtualization container is replaced with the current IP address associated with the persistent connection virtualization container. Caching service virtualization container may identify the entry of the data structure to update based on the secondary storage system identifier associated with a secondary storage system. This may enable an internal load balancer of the cloud service system to provide one or more commands received from a UI service virtualization container of the cloud service system to the appropriate persistent connection virtualization container. This may also enable a load balancer to provide data received from a master node of a secondary storage system to the appropriate persistent connection virtualization container.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive one or more commands via a user interface of a user interface virtualization container of a cloud service system comprised of one or more servers, wherein the cloud service system includes a plurality of persistent connection virtualization containers corresponding to a plurality of secondary storage systems;
request from a caching service virtualization container of the cloud service system an identifier associated with a persistent connection virtualization container of the cloud service system corresponding to a specified secondary storage system identifier associated with a secondary storage system, wherein the caching service virtualization container includes a data structure that is configured to associate persistent connection virtualization containers with their corresponding secondary storage systems;
receive the identifier associated with the persistent connection virtualization container of the cloud service system corresponding to the specified secondary storage system identifier; and
provide the one or more commands to the persistent connection virtualization container of the cloud service system associated with the secondary storage system, wherein the persistent connection virtualization container of the cloud service system associated with the secondary storage system is configured to provide the one or more commands to the secondary storage system via a persistent connection established between persistent connection virtualization container of the cloud service system associated with the secondary storage system and the secondary storage system, wherein the persistent connection virtualization container of the cloud service system is configured to update the data structure upon bidirectional communications being established with the secondary storage system, wherein the data structure is updated upon bidirectional communications being re-established between the persistent connection virtualization container of the cloud service system and the secondary storage system, wherein the persistent connection virtualization container of the cloud service system has a first internet protocol address upon the bidirectional communications being initially established between the persistent connection virtualization container of the cloud service system and the secondary storage system and a second internet protocol address upon the bidirectional communications being re-established between the persistent connection virtualization container of the cloud service system and the secondary storage system, wherein the persistent connection virtualization container of the cloud service system is hosted on a first access service when having the first internet protocol address and the persistent connection virtualization container of the cloud service system is hosted on a second access service when having the second internet protocol address; and a memory coupled to the one or more processors and configured to provide the one or more processors with instructions.

2. The system of claim 1, wherein the user interface virtualization container is configured to provide to a user device the user interface, wherein the one or more commands are received from one or more inputs inputted via the user interface.

3. The system of claim 2, wherein at least one of the one or more commands is a command to cause the secondary storage system to perform a backup snapshot of a primary system.

4. The system of claim 1, wherein the one or more commands are provided to the persistent connection virtualization container based on an internet protocol address associated with the persistent connection virtualization container of the cloud service system associated with the secondary storage system.

5. The system of claim 1, wherein the data structure is configured to associate the persistent connection virtualization container of the cloud service system with the secondary storage system based on an internet protocol address associated with the persistent connection virtualization container and the specified secondary storage system identifier.

6. The system of claim 1, wherein the data structure is updated upon bidirectional communications being initially established between the persistent connection virtualization container of the cloud service system and the secondary storage system.

7. The system of claim 1, wherein an access service is hosted on a server.

8. The system of claim 7, wherein the access service is associated with a plurality of persistent connection virtualization containers, wherein the persistent connection virtualization container of the cloud service system is one of the plurality of persistent connection virtualization containers of the cloud service system.

9. The system of claim 8, wherein the plurality of persistent connection virtualization containers of the cloud service system have corresponding internet protocol addresses.

10. The system of claim 8, wherein the access service is part of the cloud service system.

11. The system of claim 10, wherein the cloud service system is comprised of a plurality of access services, each access service having a corresponding plurality of persistent connection virtualization containers.

12. The system of claim 11, wherein the corresponding plurality of persistent connection virtualization containers are associated with corresponding secondary storage systems.

13. A method, comprising:
receiving one or more commands via a user interface of a user interface virtualization container of a cloud service system comprised of one or more servers wherein the cloud service system includes a plurality of persistent connection virtualization containers corresponding to a plurality of secondary storage systems;
requesting from a caching service virtualization container of the cloud service system an identifier associated with a persistent connection virtualization container of the cloud service system corresponding to a specified secondary storage system identifier associated with a secondary storage system, wherein the caching service virtualization container includes a data structure that is configured to associate persistent connection virtualization containers with their corresponding secondary storage systems;

receiving the identifier associated with the persistent connection virtualization container of the cloud service system corresponding to the specified secondary storage system identifier; and providing the one or more commands to the persistent connection virtualization container of the cloud service system associated with the secondary storage system, wherein the persistent connection virtualization container of the cloud service system associated with the secondary storage system is configured to provide the one or more commands to the secondary storage system via a persistent connection established between persistent connection virtualization container of the cloud service system associated with the secondary storage system and the secondary storage system, wherein the persistent connection virtualization container of the cloud service system is configured to update the data structure upon bidirectional communications being established with the secondary storage system, wherein the data structure is updated upon bidirectional communications being re-established between the persistent connection virtualization container of the cloud service system and the secondary storage system, wherein the persistent connection virtualization container of the cloud service system has a first internet protocol address upon the bidirectional communications being initially established between the persistent connection virtualization container of the cloud service system and the secondary storage system and a second internet protocol address upon the bidirectional communications being re-established between the persistent connection virtualization container of the cloud service system and the secondary storage system, wherein the persistent connection virtualization container of the cloud service system is hosted on a first access service when having the first internet protocol address and the persistent connection virtualization container of the cloud service system is hosted on a second access service when having the second internet protocol address.

14. A computer program product, the computer program product being embodied in a non-transitory computer readable storage medium and comprising computer instructions for:

receiving one or more commands via a user interface of a user interface virtualization container of a cloud service system comprised of one or more servers, wherein the cloud service system includes a plurality of persistent connection virtualization containers corresponding to a plurality of secondary storage systems;

requesting from a caching service virtualization container of the cloud service system an identifier associated with a persistent connection virtualization container of the cloud service system corresponding to a specified secondary storage system identifier associated with a secondary storage system, wherein the caching service virtualization container includes a data structure that is configured to associate persistent connection virtualization containers with their corresponding secondary storage systems;

receiving the identifier associated with the persistent connection virtualization container of the cloud service system corresponding to the specified secondary storage system identifier; and providing the one or more commands to the persistent connection virtualization container of the cloud service system associated with the secondary storage system, wherein the persistent connection virtualization container of the cloud service system associated with the secondary storage system is configured to provide the one or more commands to the secondary storage system via a persistent connection established between persistent connection virtualization container of the cloud service system associated with the secondary storage system and the secondary storage system, wherein the persistent connection virtualization container of the cloud service system is configured to update the data structure upon bidirectional communications being established with the secondary storage system, wherein the data structure is updated upon bidirectional communications being re-established between the persistent connection virtualization container of the cloud service system and the secondary storage system, wherein the persistent connection virtualization container of the cloud service system has a first internet protocol address upon the bidirectional communications being initially established between the persistent connection virtualization container of the cloud service system and the secondary storage system and a second internet protocol address upon the bidirectional communications being re-established between the persistent connection virtualization container of the cloud service system and the secondary storage system, wherein the persistent connection virtualization container of the cloud service system is hosted on a first access service when having the first internet protocol address and the persistent connection virtualization container of the cloud service system is hosted on a second access service when having the second internet protocol address.

15. The method of claim 13, wherein the user interface virtualization container is configured to provide to a user device the user interface, wherein the one or more commands are received from one or more inputs inputted via the user interface.

16. The method of claim 15, wherein at least one of the one or more commands is a command to cause the secondary storage system to perform a backup snapshot of a primary system.

17. The method of claim 13, wherein the one or more commands are provided to the persistent connection virtualization container based on an internet protocol address associated with the persistent connection virtualization container of the cloud service system associated with the secondary storage system.

18. The method of claim 13, wherein the data structure is configured to associate the persistent connection virtualization container of the cloud service system with the secondary storage system based on an internet protocol address associated with the persistent connection virtualization container and the specified secondary storage system identifier.

19. The method of claim 13, wherein the data structure is updated upon bidirectional communications being initially established between the persistent connection virtualization container of the cloud service system and the secondary storage system.

20. The method of claim 13, wherein an access service is hosted on a server.

21. The method of claim 20, wherein the access service is associated with a plurality of persistent connection virtualization containers, wherein the persistent connection virtualization container of the cloud service system is one of the plurality of persistent connection virtualization containers of the cloud service system.

22. The method of claim 21, wherein the plurality of persistent connection virtualization containers of the cloud service system have corresponding internet protocol addresses.

23. The method of claim 21, wherein the access service is part of the cloud service system.

24. The method of claim 23, wherein the cloud service system is comprised of a plurality of access services, each access service having a corresponding plurality of persistent connection virtualization containers.

25. The method of claim 24, wherein the corresponding plurality of persistent connection virtualization containers are associated with corresponding secondary storage systems.

* * * * *